US010735630B2

(12) United States Patent
Hirotsune

(10) Patent No.: US 10,735,630 B2
(45) Date of Patent: Aug. 4, 2020

(54) IMAGE QUALITY ADJUSTMENT DEVICE, IMAGE QUALITY ADJUSTMENT SYSTEM AND IMAGE QUALITY ADJUSTMENT METHOD

(71) Applicant: Panasonic Liquid Crystal Display Co., Ltd., Hyogo (JP)

(72) Inventor: Satoshi Hirotsune, Hyogo (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 0 days.

(21) Appl. No.: 16/359,310

(22) Filed: Mar. 20, 2019

(65) Prior Publication Data

US 2019/0306384 A1 Oct. 3, 2019

(30) Foreign Application Priority Data

Mar. 27, 2018 (JP) .................................. 2018-060935

(51) Int. Cl.
| | |
|---|---|
| *H04N 5/217* | (2011.01) |
| *H04N 9/083* | (2006.01) |
| *H04N 5/232* | (2006.01) |
| *H04N 9/04* | (2006.01) |
| *G01J 1/42* | (2006.01) |
| *G09G 3/36* | (2006.01) |

(Continued)

(52) U.S. Cl.
CPC .............. *H04N 5/2173* (2013.01); *G01J 1/42* (2013.01); *G09G 3/3607* (2013.01); *H04N 5/23296* (2013.01); *H04N 9/0455* (2018.08); *H04N 9/083* (2013.01); *G01J 2001/4247* (2013.01); *G09G 2320/0285* (2013.01); *G09G 2320/0666* (2013.01); *G09G 2320/0693* (2013.01)

(58) Field of Classification Search
CPC ............. H04N 5/2173; H04N 5/23296; H04N 9/0455; H04N 9/083; G01J 1/42; G01J 2001/4247; G09C 3/3607; G01N 2021/8845; G01N 21/88; G01N 2223/645; G06T 2207/30168
See application file for complete search history.

(56) References Cited

U.S. PATENT DOCUMENTS

| | | | |
|---|---|---|---|
| 2005/0023439 A1* | 2/2005 | Cartlidge ........... | G02B 27/0012 250/208.1 |
| 2014/0232907 A1* | 8/2014 | Endo .................. | H04N 5/23232 348/240.1 |

(Continued)

FOREIGN PATENT DOCUMENTS

WO 2014/050222 4/2014

*Primary Examiner* — Alexander Gee
(74) *Attorney, Agent, or Firm* — Wenderoth, Lind & Ponack, L.L.P.

(57) ABSTRACT

An image quality adjustment device includes: a lighting controller that controls a display panel including a plurality of pixels, each including arrangement of a plurality of subpixels such that the display panel displays a measurement image in which a part of the plurality of subpixels is lit; and a first electric filter that removes at least a spatial frequency component greater than or equal to fd/2 from a first image obtained by capturing the measurement image displayed on the display panel using an capture device when a panel spatial frequency determined by a pixel pitch of the pixel in a direction in which the plurality of subpixels are arrayed is set to fd.

12 Claims, 16 Drawing Sheets

(51) Int. Cl.
  *G06T 5/00*   (2006.01)
  *G06T 7/00*   (2017.01)
  *G09G 3/32*   (2016.01)
  *H04N 17/04*  (2006.01)
  *G02F 1/13*   (2006.01)

(56) References Cited

U.S. PATENT DOCUMENTS

| | | | | |
|---|---|---|---|---|
| 2014/0253761 A1* | 9/2014 | Okada | .................. | H04N 5/2254 |
| | | | | 348/240.2 |
| 2015/0271409 A1* | 9/2015 | Imoto | .................... | H04N 5/341 |
| | | | | 345/589 |
| 2016/0381336 A1* | 12/2016 | Akahane | .............. | H04N 5/3572 |
| | | | | 348/239 |
| 2017/0020477 A1* | 1/2017 | Hatakeyama | .......... | A61B 6/545 |

* cited by examiner

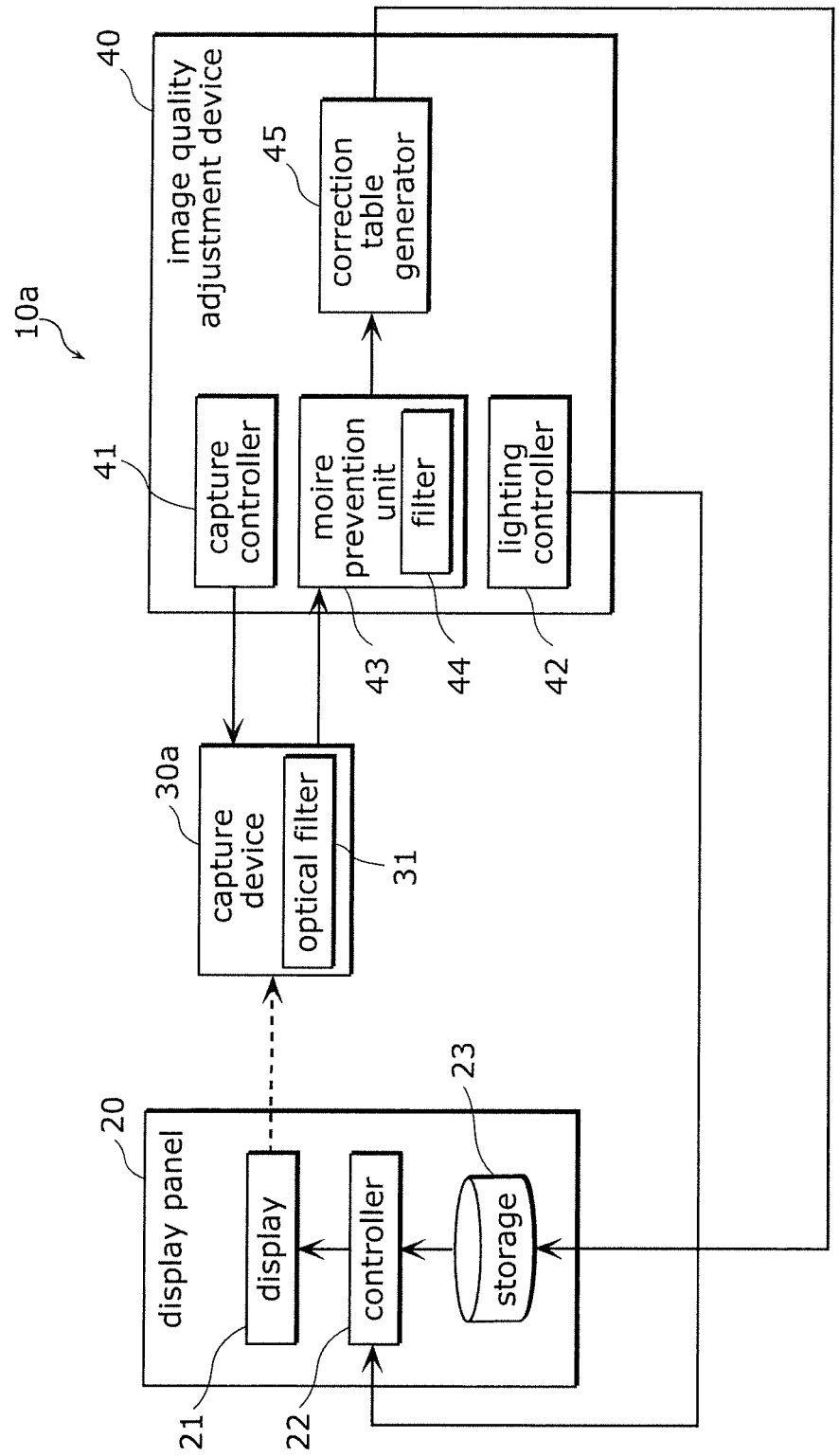

IMAGE QUALITY ADJUSTMENT DEVICE, IMAGE QUALITY ADJUSTMENT SYSTEM AND IMAGE QUALITY ADJUSTMENT METHOD

CROSS-REFERENCE TO RELATED APPLICATION

This application claims priority from Japanese application JP 2018-060935, filed on Mar. 27, 2018. This Japanese application is incorporated herein by reference.

TECHNICAL FIELD

The present disclosure relates to an image quality adjustment device, an image quality adjustment system, and an image quality adjustment method.

BACKGROUND

It is known that display unevenness due to a manufacturing variation is generated in liquid crystal panels and display panels such as an organic EL. For example, it is known that the display unevenness due to a film thickness of an alignment film, the display unevenness due to an aperture ratio of a color filter (or a black mask), and the display unevenness due to an in-plane variation in brightness of a backlight are generated in the liquid crystal panel.

For this reason, at a manufacturing stage, a correction table for reducing the display unevenness is generated based on display unevenness data obtained by measuring the display unevenness of the display panel, and the correction table is stored in the display panel. The display panel can perform display in which the display unevenness is reduced by correcting the display data for displaying video based on the correction table.

Measurement of the display unevenness is performed by capturing an image of the display panel that displays a predetermined image using an capture device (for example, a CCD camera). At this point, moire is included in the captured image when a pixel pitch of the display panel is different from a pixel pitch of a CCD image sensor of the CCD camera. When the correction table is generated based on the captured image including the moire, the display unevenness cannot be accurately corrected.

PCT International Publication No. 2014/050222 discloses a method for disposing the display panel and the capture device at a predetermined relative angle in order to shift a spatial frequency component of the moire out of a region where the spatial frequency component of the display unevenness exists.

SUMMARY

In the method of PCT International Publication No. 2014/050222, it is necessary that the display panel and the capture device be disposed at the predetermined relative angle. That is, in order to reduce the moire, it is necessary to take a strict measure (management) such as the disposition of the display panel and the capture device at the predetermined relative angle. It is desirable that the moire included in the captured image can easily be reduced. It is desirable that the moire included in the captured image be further reduced.

The present disclosure provides an image quality adjustment device, an image quality adjustment system, and an image quality adjustment method capable of further reducing the moire included in the captured image.

An image quality adjustment device according to the present disclosure includes: a lighting controller that controls a display panel including a plurality of pixels, each including arrangement of a plurality of subpixels such that the display panel displays a measurement image in which a part of the plurality of subpixels is lit; and a first electric filter that removes at least a spatial frequency component greater than or equal to fd/2 from a first image obtained by capturing the measurement image displayed on the display panel using an capture device when a panel spatial frequency determined by a pixel pitch of the pixel in a direction in which the plurality of subpixels are arrayed is set to fd.

An image quality adjustment system according to the present disclosure includes: the above image quality adjustment device; and an capture device that outputs to the image quality adjustment device an image obtained by capturing an image of a display panel, wherein the capture device includes an optical filter that removes a spatial frequency component greater than or equal to a half of a sampling frequency of the capture device.

An image quality adjustment method according to the present disclosure includes: controlling a display panel including a plurality of pixels, each including arrangement of a plurality of subpixels, such that the display panel displays a measurement image in which a part of the plurality of subpixels is lit; and removing at least a spatial frequency component greater than or equal to fd/2 from a first image obtained by capturing the measurement image displayed on the display panel using an capture device when a panel spatial frequency determined by a pixel pitch of the pixel in a direction in which the plurality of subpixels are arrayed is set to fd.

BRIEF DESCRIPTION OF THE DRAWINGS

FIG. 6 is a block diagram illustrating a configuration of an image quality adjustment system according to a modification of the first exemplary embodiment;

DETAILED DESCRIPTION

The following describes an exemplary embodiment of the present disclosure. The embodiment described below is merely one specific example of the present disclosure. The numerical values, shapes, materials, elements, and arrangement and connection of the elements, etc. indicated in the following embodiment are given merely by way of illustration and are not intended to limit the present disclosure. Therefore, among elements in the following embodiment, those not recited in any one of the independent claims defining the broadest inventive concept of the present disclosure are described as optional elements.

Note that the figures are schematic illustrations and are not necessarily precise depictions. Accordingly, the figures are not necessarily to scale. Moreover, in the figures, elements that are essentially the same share like reference signs. Accordingly, duplicate description is omitted or simplified.

First Exemplary Embodiment

Hereinafter, an image quality adjustment system according to a first exemplary embodiment will be described with reference to FIGS. 1 to 5C.

[1-1. Configuration of Image Quality Adjustment System]

A configuration of the image quality adjustment system of the first exemplary embodiment will be described with reference to FIGS. 1 to 3B.

Figure 1:
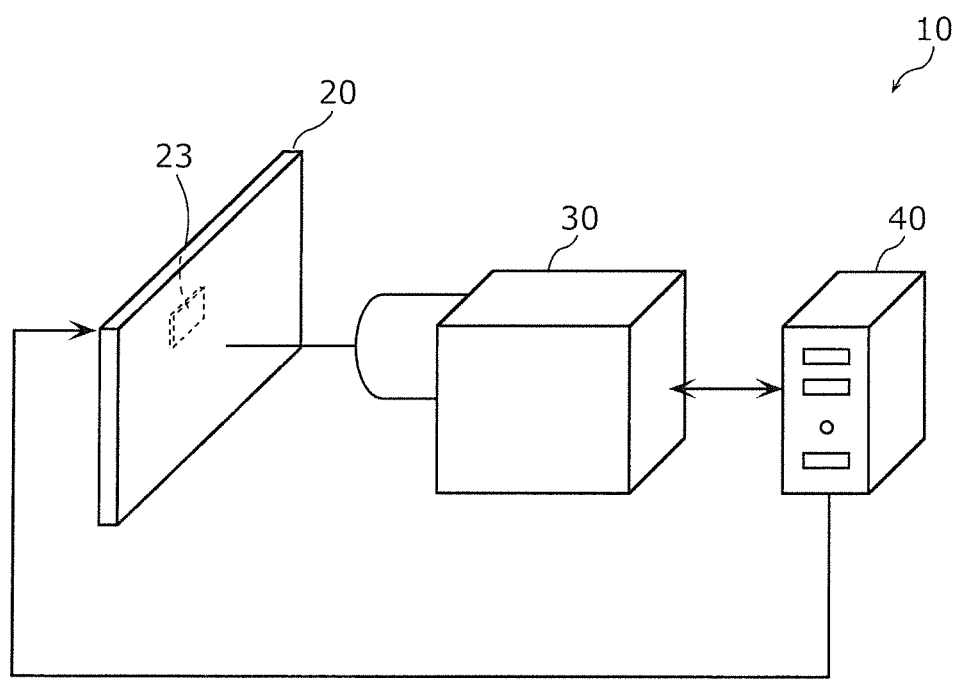
FIG. 1 is a view illustrating a schematic configuration of an image quality adjustment system according to a first exemplary embodiment.
Figure 2:
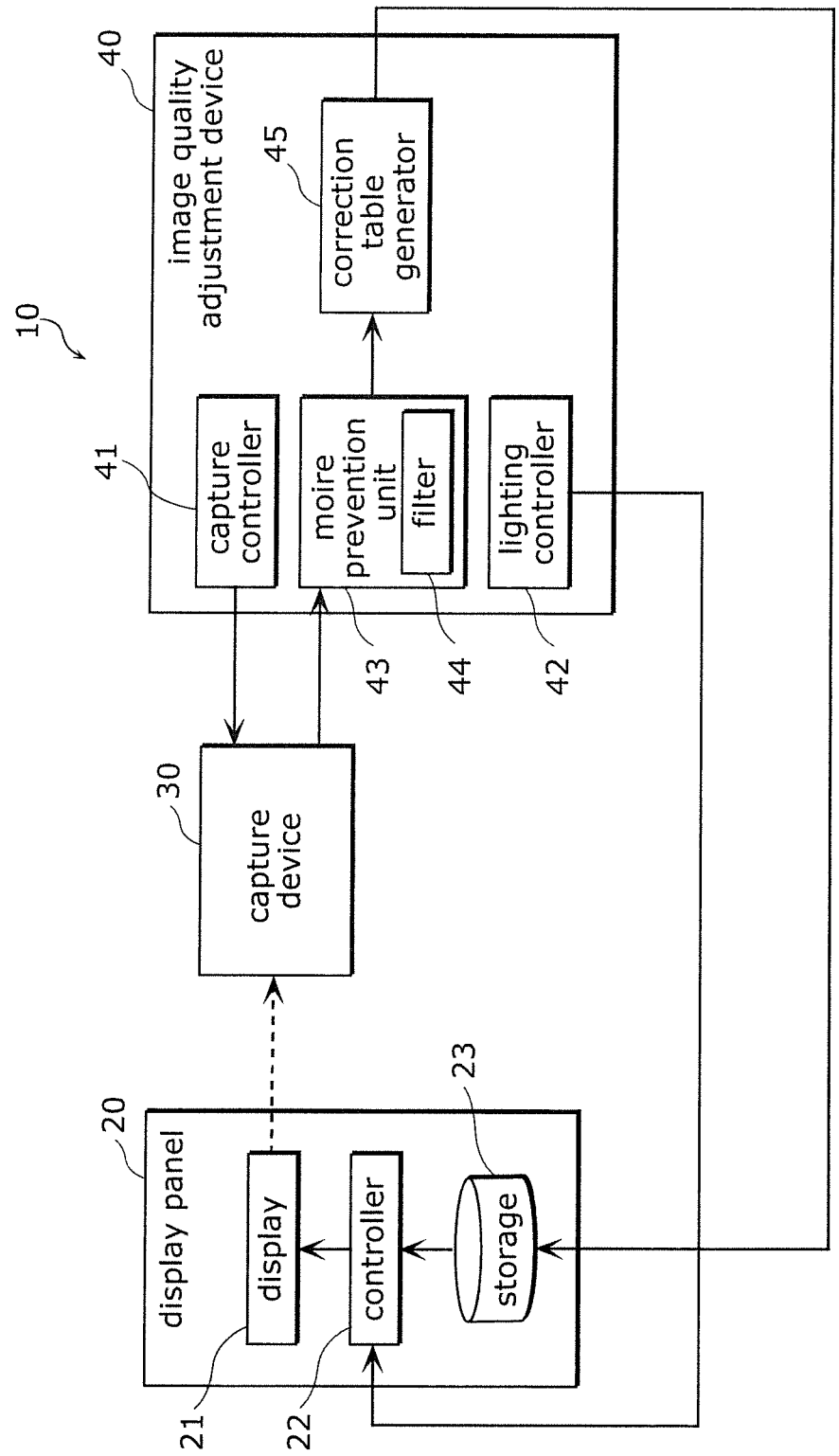
FIG. 2 is a block diagram illustrating a configuration of the image quality adjustment system of the first exemplary embodiment.

FIG. 1 is a view illustrating a schematic configuration of image quality adjustment system 10 of the first exemplary embodiment. FIG. 2 is a block diagram illustrating a configuration of image quality adjustment system 10 of the first exemplary embodiment.

As illustrated in FIGS. 1 and 2, image quality adjustment system 10 of the first exemplary embodiment includes display panel 20, capture device 30, and image quality adjustment device 40. Image quality adjustment device 40 is communicably connected to display panel 20 and capture device 30.

Display panel 20 is a display module that displays a predetermined image and the like, and includes display 21, controller 22, and storage 23.

Display 21 is a liquid crystal panel or an organic EL panel, which displays an image based on an image signal from controller 22. In display 21, a plurality of pixels are regularly arranged in a lattice pattern. In the case where display panel 20 includes the liquid crystal panel, display panel 20 may further include a backlight (light source) that emits light to the liquid crystal panel. For example, display 21 may include the liquid crystal panel and the backlight.

Each of the plurality of pixels constituting display 21 includes a plurality of subpixels. For example, the plurality of subpixels emit light of a different color. In the first exemplary embodiment, the pixel is constituted by three subpixels. Specifically, each of the plurality of pixels has subpixels (RBG subpixels) that emit red, green, and blue colors.

Controller 22 causes display 21 to display display data acquired from lighting controller 42 of image quality adjustment device 40. Controller 22 corrects the display data for displaying an image using a correction table for correcting display unevenness of display panel 20, and outputs the corrected display data to display 21. Specifically, controller 22 corrects an RGB level of the input image signal based on the correction table read from storage 23. The image displayed by the display data acquired from lighting controller 42 of image quality adjustment device 40 is an example of a measurement image for measuring the display unevenness. In the following description, luminance unevenness will be described as an example of the display unevenness of display panel 20.

Storage 23 stores the correction table for correcting the luminance unevenness of the display panel. For example, storage 23 stores the correction table generated by correction table generator 45 of image quality adjustment device 40. Storage 23 does not record the correction table before processing of image quality adjustment system 10 is performed.

Controller 22 and storage 23 are incorporated in display panel 20 in order to correct the display unevenness of display panel 20. For example, controller 22 is configured with a timing controller, and storage 23 is configured with a volatile or nonvolatile memory.

Capture device 30 captures the image displayed by display 21. For example, capture device 30 is implemented by a camera that acquires a captured image by light receiving elements (pixels), such as CCDs, which are arranged in a regular grid pattern. For example, capture device 30 is a camera (monochrome camera) including monochrome imaging elements that capture a monochrome image. For example, the monochrome image element is an element in which one pixel is formed by one light receiving element.

Moire may be generated in the captured image when capture device 30 including the light receiving elements arranged in a lattice shape captures display 21 including the lattice-shaped pixels. In the first exemplary embodiment, an influence of the moire is prevented by the measurement image, which is displayed on display 21 when capture device 30 captures display 21, and a filter.

For example, capture device 30 is incorporated in a manufacturing line, captures the measurement image displayed by display panel 20 in each display panel 20, and outputs the captured image obtained by the image capturing to image quality adjustment device 40.

Using the captured image acquired from capture device 30, image quality adjustment device 40 generates the correction table for preventing the luminance unevenness of display 21. Image quality adjustment device 40 stores the generated correction table in storage 23 of display panel 20. For example, image quality adjustment device 40 generates the correction table corresponding to display panel 20 based on the captured image acquired in each display panel 20. Image quality adjustment device 40 includes capture controller 41, lighting controller 42, moire prevention unit 43, and correction table generator 45.

Capture controller 41 controls a spatial sampling frequency of capture device 30 in order to capture the image of display panel 20. For example, capture controller 41 may change the spatial sampling frequency of capture device 30 by changing magnification of a lens of capture device 30. Capture controller 41 can reduce the spatial sampling frequency of capture device 30 by reducing the magnification of the lens. Capture controller 41 may perform control such as start and stop of the image capturing of capture device 30.

The method for controlling the spatial sampling frequency of capture device 30 is not limited to the above configuration. Capture device 30 is installed on a movable base that can change a distance from display panel 20, and capture controller 41 controls the movable base to change the distance between capture device 30 and display panel 20, whereby the spatial sampling frequency may be changed. Capture controller 41 can reduce the spatial sampling frequency by increasing a distance between capture device 30 and display panel 20. The spatial sampling frequency of capture device 30 also depends on the pixel pitch in an arrangement direction of the plurality of subpixels 21a to 21c of display panel 20 among the plurality of pixels included in the imaging element (for example, a CCD image sensor) of capture device 30. That is, the spatial sampling frequency of capture device 30 can be determined by the pixel pitch of the imaging element and the magnification of the lens of capture device 30 or the distance between capture device 30 and display panel 20. For example, when the pixel pitch of the imaging element is equal to the pixel pitch in the arrangement direction of display panel 20 to be captured, and when the magnification of the lens or the distance between capture device 30 and display panel 20 is adjusted such that the pixel of the imaging element and the pixel of display panel 20 corresponds to each other in a one-to-one manner, the spatial sampling frequency of capture device 30 coincides with the spatial frequency of display panel 20. Hereinafter, the spatial sampling frequency of capture device 30 is also simply referred to as a sampling frequency.

The spatial sampling frequency of capture device 30 controlled by capture controller 41 will be described with reference to FIG. 3A.

Figure 3A:
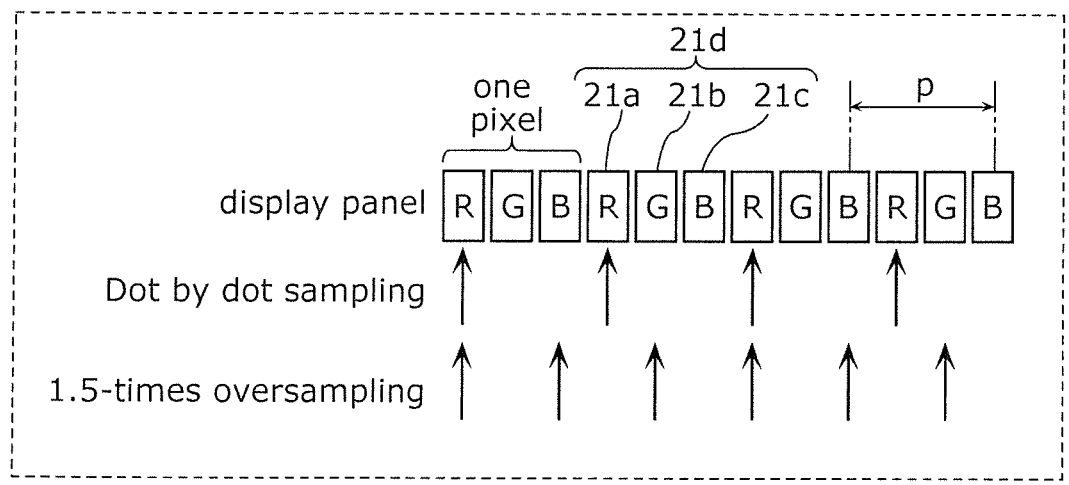
FIG. 3A is a view illustrating a spatial sampling frequency of an capture device of the first exemplary embodiment.

FIG. 3A is a view illustrating the spatial sampling frequency of capture device 30 of the first exemplary embodiment. In FIG. 3A, only pixels arranged one-dimensionally are illustrated.

As illustrated in FIG. 3A, display panel 20 includes a plurality of pixels 21d (one pixel) constituted by three subpixels 21a to 21c. For example, subpixel 21a emits the red color, subpixel 21b emits the green color, and subpixel 21c emits the blue color. A black mask is formed in a region (gap) between the adjacent subpixels.

FIG. 3A illustrates two sampling frequencies of "dot by dot sampling" and "1.5-times oversampling". "Dot by dot sampling" illustrates the case where the image of one pixel of display panel 20 is captured using one pixel of capture device 30. "Dot by dot sampling" illustrates the case where pixel pitch p of display panel 20 and a pitch (see an arrow in FIG. 3A) at which capture device 30 samples display panel 20 are equal to each other. That is, "dot by dot sampling" illustrates the case where the sampling frequency of capture device 30 coincides with a panel spatial frequency corresponding to pixel pitch p of display panel 20.

The moire is not generated when the panel spatial frequency of display panel 20 and the sampling frequency of capture device 30 completely coincides with each other, but it is difficult to make the panel spatial frequency of display panel 20 and the sampling frequency of capture device 30 completely coincide with each other due to deflection of display panel 20 and aberration of the lens of capture device 30. For this reason, in the first exemplary embodiment, the sampling frequency of capture device 30 is changed to shift a part of the moire component to a high-frequency side, which allows reduction of the moire component included in a spatial frequency region of the display unevenness.

"1.5-times oversampling" illustrates the case where the sampling frequency of capture device 30 is 1.5 times the panel spatial frequency of display panel 20. That is, capture device 30 samples display panel 20 with a pitch finer than pixel pitch p of display panel 20. In the first exemplary embodiment, by way of example, capture controller 41 controls the sampling frequency of capture device 30 to 1.5 times the panel spatial frequency of display panel 20. Alternatively, the sampling frequency of capture device 30 may be controlled so as to be greater than or equal to the panel spatial frequency of display panel 20. Pixel pitch p and the panel spatial frequency of display panel 20 are fixed values. The sampling frequency of capture device 30 is a value that varies according to the control of capture controller 41. For example, the sampling frequency of capture device 30 of the first exemplary embodiment is determined by the pixel pitch of capture device 30 and the magnification of the lens of capture device 30.

Referring to FIG. 2, lighting controller 42 controls a display state of display panel 20 when capture device 30 captures the image of display panel 20. The first exemplary embodiment is characterized by the image (measurement image) displayed on display panel 20 by lighting controller 42.

The measurement image displayed on display panel 20 by lighting controller 42 will be described with reference to FIG. 3B.

Figure 3B:
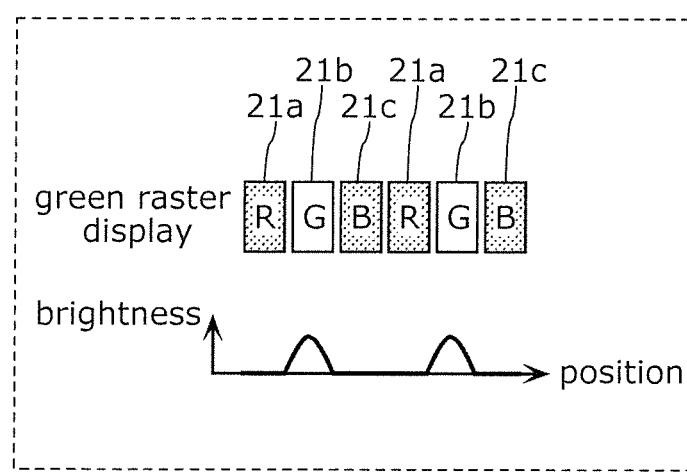
FIG. 3B is a view illustrating a lighting state of a display panel of the first exemplary embodiment.

FIG. 3B is a view illustrating a lighting state of display panel 20 of the first exemplary embodiment. In FIG. 3B, the lit subpixel (for example, subpixel 21b) is indicated by a white background, and the turned-off subpixel (for example, subpixels 21a and 21c) is indicated by dot hatching. As used herein, the term "turned off" includes lighting with luminance of about several percent of the maximum value of the luminance of the subpixel. That is, the term "turned off" is not limited to the fact that the luminance of the subpixel is the minimum value of the luminance of the subpixel.

As illustrated in FIG. 3B, in each of the plurality of pixels, lighting controller 42 lights a part of the plurality of subpixels 21a to 21c included in the pixel. That is, lighting controller 42 lights the plurality of subpixels 21a to 21c in a thinned-out manner (partially driving method). For example, lighting controller 42 lights only one subpixel among subpixels 21a to 21c. In the first exemplary embodiment, lighting controller 42 lights only subpixel 21b (that is, green) ("green raster display" in FIG. 3B). Specifically, lighting controller 42 outputs to the controller 22 the image signal in which the plurality of subpixels 21b include an identical gradation value. Consequently, brightness of a position corresponding to subpixel 21b is increased. When lighting controller 42 performs the above control, display panel 20 displays an image in which a whole surface is green as the measurement image. Since capture device 30 has high sensitivity to green, the captured image can be generated from the light receiving signal having an improved S/N.

Lighting controller 42 may sequentially change the gradation value (0 to 1023 when a bit width of the pixel signal is 10 bits) included in the image signal output to display panel 20. For example, lighting controller 42 may sequentially change the gradation value for displaying the measurement image every time capture device 30 captures the image of display panel 20 that displays the measurement image. That is, image quality adjustment device 40 may acquire a plurality of captured images having different gradation values for one display panel 20.

Referring to FIG. 2, when moire prevention unit 43 acquires the captured image obtained by capturing the image of display panel 20 that displays the measurement image from capture device 30, the moire prevention unit 43 performs processing of removing the moire included in the captured image. The moire prevention unit 43 includes filter 44.

Filter 44 is an electric filter for removing moire (for example, a low-pass filter) that removes the moire from the captured image acquired from capture device 30. Filter 44 is implemented with a digital filter or an FFT filter. Filter 44 is an example of a first electric filter.

The captured image from which the moire is removed is output to correction table generator 45. Filter 44 removes at least a spatial frequency component greater than or equal to a half of the panel spatial frequency. In other words, filter 44 is set such that the spatial frequency component in a region where the display unevenness exists passes through filter 44.

When acquiring the captured image from which the moire is removed, correction table generator 45 performs unevenness measurement, generates the correction table (for example, a lookup table) from a result of the unevenness measurement, and outputs the result to controller 22. The unevenness measurement includes correlation of the gradation value included in the image signal output to display panel 20 by lighting controller 42 with the luminance acquired from the captured image at the gradation value. The correction table is a table for correcting the display unevenness of display panel 20. The correction table is a table including a correction value (or a correction coefficient) for bringing the luminance at the gradation value close to a target characteristic (for example, a gamma characteristic with a gamma value of 2.2) from a correspondence relationship between the gradation value and the luminance. The correction table may have the correction value in each pixel of display panel 20, or have the correction value in each of the plurality of pixels (pixel blocks).

For example, image quality adjustment device 40 is implemented with a personal computer.

[1-2. Processing of Image Quality Adjustment System]

The processing of image quality adjustment system 10 will be described below with reference to FIGS. 4 to 5C.

Figure 4:
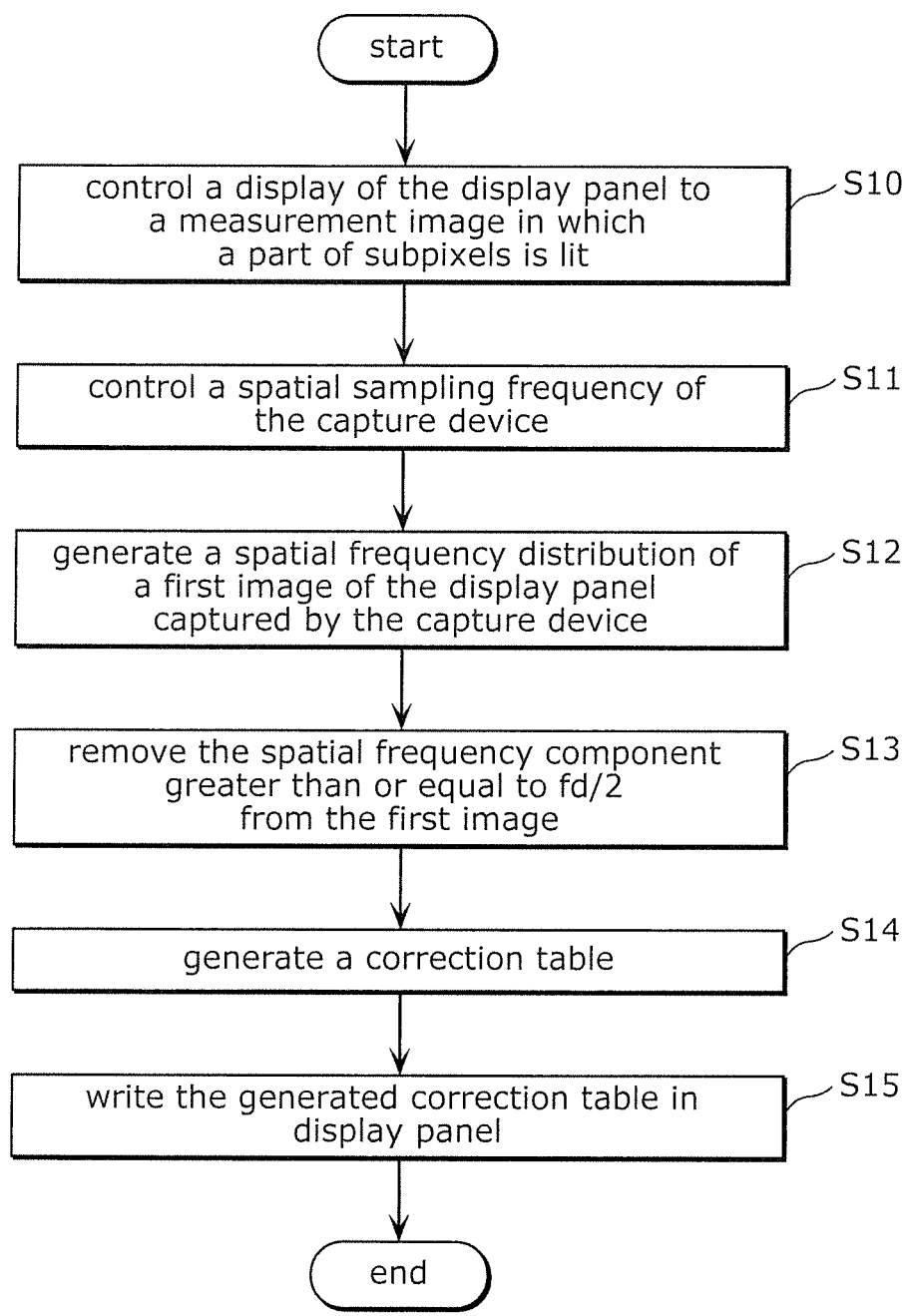
FIG. 4 is a flowchart illustrating an example of processing of the image quality adjustment device of the first exemplary embodiment.

FIG. 4 is a flowchart illustrating an example of the processing of image quality adjustment device 40 of the first exemplary embodiment.

As illustrated in FIG. 4, image quality adjustment device 40 controls the display of display panel 20 to the measurement image in which a part of the subpixels (for example, subpixels 21b) is lit (S10). Specifically, lighting controller 42 causes the display panel to display the measurement image in which only subpixel 21b among the plurality of subpixels 21a to 21c of display panel 20 is lit. Consequently, for example, display panel 20 displays the image in which the whole surface is green. Lighting controller 42 outputs to display panel 20 the image signal in which the plurality of subpixels 21b include the identical gradation value.

Subsequently, image quality adjustment device 40 controls the sampling frequency of capture device 30 (S11). Specifically, capture controller 41 controls the magnification of the lens of capture device 30 such that the sampling frequency of capture device 30 is 1.5 times the panel spatial frequency of display panel 20. Capture device 30 captures the image of display panel 20 that displays the measurement image. The sampling frequency which is 1.5 times the panel spatial frequency is an example of a first spatial sampling frequency.

Subsequently, image quality adjustment device 40 generates a spatial frequency distribution of the captured image (an example of a first image) of display panel 20 captured by capture device 30 (S12). Specifically, moire prevention unit 43 generates the spatial frequency distribution of the captured image from the captured image acquired from capture device 30.

The spatial frequency distribution generated by moire prevention unit 43 will be described with reference to FIGS. 5A to 5C.

Figure 5A:
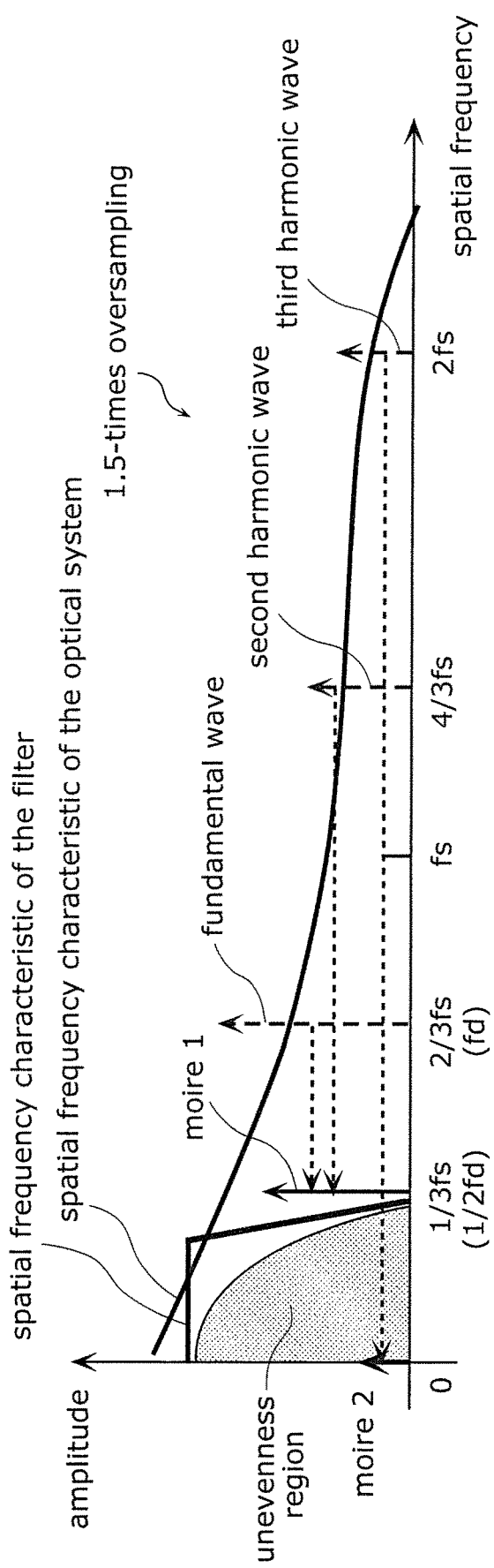
FIG. 5A is a view illustrating removal of a moire component during 1.5-times oversampling of the first exemplary embodiment.

FIG. 5A is a view illustrating the removal of the moire component during the 1.5-times oversampling of the first exemplary embodiment. In FIG. 5A, a vertical axis indicates amplitude (intensity) and a horizontal axis indicates a spatial frequency. Here, fs represents the sampling frequency of capture device 30, and sampling frequency fs is 1.5 times panel spatial frequency fd. The "unevenness region" in FIG. 5A indicates a distribution of the luminance unevenness of display panel 20 due to a manufacturing variation, and the unevenness region is generated in a spatial frequency region less than or equal to a half of panel spatial frequency fd of display panel 20.

Three broken-line arrows including a fundamental wave component (fundamental wave), a second harmonic component (second harmonic wave), and a third harmonic component (third harmonic wave)) extending in a direction parallel to the vertical axis in FIG. 5A are a component generated by shading of the brightness (for example, the shading caused by the black mask) excluding the display unevenness of display panel 20. That is, the fundamental wave, the second harmonic wave, and the third harmonic wave in FIG. 5A are components caused by a structure of display panel 20. Two solid-line arrows (moire 1 and moire 2) extending in the direction parallel to the vertical axis in FIG. 5A indicate the component in which the fundamental wave, the second harmonic wave, and the third harmonic wave are folded back at a Nyquist frequency (folding frequency). In the first exemplary embodiment, the spatial frequency component in which the fundamental wave, the second harmonic wave, and the third harmonic wave are folded back at the Nyquist frequency is described as the moire component (moire 1 and moire 2). In FIG. 5A, the fundamental wave, the second harmonic wave, the third harmonic wave, moire 1, and moire 2 are simply indicated by the arrows. However, the fundamental wave, the second harmonic wave, the third harmonic wave, moire 1, and moire 2 are components having a predetermined spatial frequency width. The fundamental wave, the second harmonic wave, and the third harmonic wave are illustrated as an example of the spatial frequency components caused by the structure of display panel 20.

The fundamental wave is a frequency component generated at the spatial frequency of $2/3 \cdot fs$ (=fd), and is a component caused by performing the green raster display on display panel 20. The second harmonic wave is a harmonic component generated at a spatial frequency of (4/3·fs) 2 times the fundamental wave, and the third harmonic wave is a harmonic component generated at a spatial frequency of (2·fs) 3 times the fundamental wave. The second harmonic wave and the third harmonic wave are harmonic components of the fundamental wave, and are attenuated. That is, amplitudes of the second harmonic wave and the third harmonic wave are smaller than amplitude of the fundamental wave.

Although harmonic components such as a fourth harmonic wave are also generated, high-frequency components are filtered as illustrated in "spatial frequency characteristic of optical system" in FIG. 5A, so that the illustration is omitted. For example, an optical system (for example, the lens) of capture device 30 has a characteristic similar to a low-pass filter. The "spatial frequency characteristic of the optical system" in FIG. 5A is an image diagram illustrating a tendency of the spatial frequency characteristic of the optical system of capture device 30. The "spatial frequency characteristic of the optical system" illustrates a ratio based on the maximum value of the spatial frequency characteristic of the optical system. The illustration of the "spatial frequency characteristic of the optical system" is omitted in the following figures.

Moire 1 generated at the spatial frequency of 1/3·fs (1/2·fd) is generated when the fundamental wave and the second harmonic wave is folded back at the Nyquist frequency (see the broken-line arrow in the horizontal direction of FIG. 5A). The amplitude of moire 1 depends on the amplitudes of the fundamental wave and the second harmonic wave. Moire 2 generated at the spatial frequency of zero is generated when the third harmonic wave is folded back at the Nyquist frequency (see the broken-line arrow in the horizontal direction of FIG. 5A). The amplitude of moire 2 depends on the amplitude of the third harmonic wave having the smallest amplitude among the fundamental wave, the second harmonic wave, and the third harmonic wave. That is, the amplitude of moire 2 existing in the unevenness region is smaller than the amplitude of moire 1.

Figure 5B:
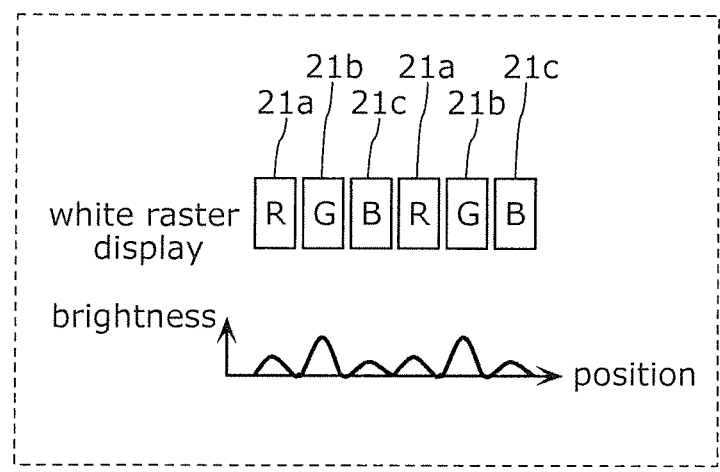
FIG. 5B is a view illustrating the lighting state of a display panel according to a comparative example.
Figure 5C:
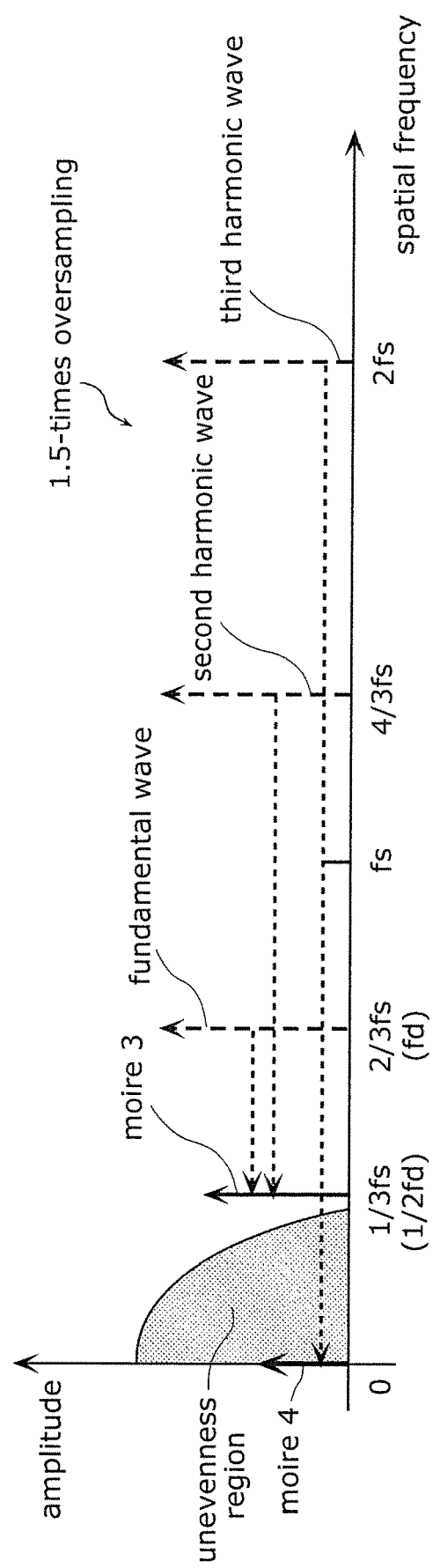
FIG. 5C is a view illustrating the moire component during the 1.5-times oversampling of the comparative example.

With reference to FIGS. 5B and 5C, the spatial frequency distribution of the image when capture device 30 captures the image of display panel 20 while all subpixels 21a to 21c of display panel 20 are lit will be described as a comparative example.

FIG. 5B is a view illustrating the lighting state of display panel 20 of the comparative example. FIG. 5C is a view illustrating the moire component during the 1.5-times oversampling of the comparative example.

As illustrated in FIG. 5B, display panel 20 of the comparative example performs white raster display in which all subpixels 21a to 21c are lit. Consequently, the brightness of the position corresponding to each of subpixels 21a to 21c is increased. The white raster display is not included in the measurement image.

As illustrated in FIG. 5C, similarly to FIG. 5A, the fundamental wave is generated at the spatial frequency of 2/3·fs, the second harmonic wave is generated at the spatial frequency of 4/3·fs, and the third harmonic wave is generated at the spatial frequency of 2·fs. The frequency component due to the shading of the brightness (for example, the shading caused by the black mask) excluding the display unevenness of display panel 20 is generated in each of the fundamental wave, the second harmonic wave, and the third harmonic wave. The amplitude of the third harmonic wave is larger than the amplitude of the third harmonic wave in FIG. 5A. Consequently, the amplitude of the moire component (moire 4) generated by the folding of the frequency component is larger than the amplitude of moire 2 in FIG. 5A. This is because the spatial frequency component due to the structure of display panel 20 is generated at the spatial frequencies of 2/3·fs, 4/3·fs, and 2·fs by lighting of each of subpixels 21a to 21c of display panel 20. This allows increase of the amplitude of moire 4 that is the frequency component in which the third harmonic wave is folded back at the Nyquist frequency. That is, the moire component existing in the unevenness region is increased.

As described above, the image obtained by capturing the image of display panel 20 in which only a part of the subpixels (for example, subpixel 21b) among the plurality of subpixels 21a to 21c using capture device 30 are lit is the image in which the spatial frequency component generated at the spatial frequency of 2·fs is reduced. That is, the moire component generated by folding back the spatial frequency component can be reduced. In the first exemplary embodiment, moire 2 generated at the spatial frequency of zero can be reduced.

Back to FIG. 4, the spatial frequency component greater than or equal to fd/2 is removed from the captured image (S13). Specifically, the spatial frequency component greater than or equal to fd/2 is removed from the captured image by filter 44.

As illustrated in a spatial frequency characteristic of filter 44 in FIG. 5A, the spatial frequency component greater than or equal to fs/3 (fd/2) is removed from the captured image. Consequently, the components of moire 1, the fundamental wave, the second harmonic wave, and the third harmonic wave are removed, so that the component of moire 2 remains in the captured image.

Referring to FIG. 4, the correction table for correcting the display unevenness is generated using the captured image from which the spatial frequency components greater than or equal to fd/2 is removed in step S13 (S14). Specifically, when acquiring the captured image from moire prevention unit 43, correction table generator 45 performs the unevenness measurement, and generates the correction table from the result of the unevenness measurement. The captured image acquired from moire prevention unit 43 includes the component of moire 2, but the correction table can be generated with high accuracy because moire 2 has the small amplitude and a little influence.

Correction table generator 45 calculates the correction value of pixel 21d including subpixel 21b from the captured image that is obtained while only subpixel 21b is lit. That is, one correction value is correlated with one pixel. In other words, subpixels 21a to 21c have the identical correction value. This allows prevention of the luminance unevenness of display panel 20.

As illustrated in FIG. 5A, the spatial frequency component greater than or equal to fd/2 is removed from the captured image by filter 44, but the spatial frequency component in the unevenness region is not removed. That is, correction table generator 45 can generate the correction table that can perform the correction from the luminance unevenness in the low-frequency range generated in display panel 20 up to the luminance unevenness in the high-frequency range.

Subsequently, correction table generator 45 writes the generated correction table in display panel (S15). Specifically, correction table generator 45 stores the generated correction table in storage 23 of display panel 20.

Display panel 20 can perform the display in which the luminance unevenness is reduced by correcting the RGB level of the input image signal based on the correction table stored in storage 23.

As described above, image quality adjustment device 40 includes the lighting controller 42 that controls display panel 20 including the plurality of pixels 21d, each including the arrangement of the plurality of subpixels 21a to 21c, such that display panel 20 displays the measurement image in which a part of the plurality of pixels 21a to 21c is lit, and filter 44 (an example of a first electric filter) that removes at least the spatial frequency component greater than or equal to fd/2 from the captured image (an example of the first image) obtained by capturing the measurement image displayed on display panel 20 using capture device 30 when the panel spatial frequency determined by pixel pitch p of pixels 21d in the arrangement of the plurality of subpixels 21a to 21c is set to fd.

Consequently, the components of the second harmonic wave and the third harmonic wave in the fundamental wave, the second harmonic wave, and the third harmonic wave, which are included in the captured image obtained by the image capturing using capture device 30, can be reduced as compared with the case where all of the plurality of subpixels 21a to 21c are lit. In the case where the spatial frequency characteristic of the optical system (for example, the lens) of capture device 30 has a characteristic similar to the low-pass filter, the third harmonic wave is further reduced. That is, moire 2, which is caused by folding back the third harmonic wave and exists in the unevenness region, can be reduced. Thus, the moire included in the captured image can be reduced by a simple method of changing the lighting state of display panel 20 without adjusting display panel 20 and capture device 30 to a predetermined relative angle. Filter 44 removes the spatial frequency component greater than or equal to fd/2 included in the image obtained by the image capturing using capture device 30. This allows image quality adjustment device 40 of the first exemplary embodiment to more easily reduce the moire included in the captured image. Image quality adjustment device 40 can easily obtain the spatial frequency component of the display unevenness of display panel 20 included in the captured image with high accuracy.

Image quality adjustment device 40 further includes capture controller 41 that controls the spatial sampling frequency of capture device 30 to sampling frequency fs (an example of the first spatial sampling frequency) based on the pixel pitch of capture device 30. Capture controller 41 controls sampling frequency fs such that magnification $\alpha 1$ becomes a value greater than 1 when the magnification of sampling frequency fs with respect to panel spatial frequency fd is set to $\alpha 1$. For example, capture controller 41 controls sampling frequency fs such that magnification $\alpha 1$ satisfies $1.5 \le \alpha 1 \le 2$.

As a result, in the case where magnification $\alpha 1$ is 1.5, the folding back components (moire 1 in FIG. 5A) of the fundamental wave and the second harmonic can be shifted out of the band of the spatial frequency (less than or equal to fd/2) of the display unevenness. The folding back component can be removed by filter 44. By lighting only a part of the plurality of subpixels 21a to 21c, and reducing the high frequency by the optical system of capture device 30, the folding back component of the third harmonic wave (moire 2 in FIG. 5A) can be suppressed to a level at which the influence on the measurement result of the display unevenness is negligible. Thus, the moire included in the captured image can further be reduced. The number of pixels necessary for capture device 30 can be suppressed as compared with the case where magnification $\alpha 1$ is greater than 1.5.

More generally, in the case of $\alpha 1 > 1$, the folding back component of the fundamental wave having the greatest influence (moire 1 in FIG. 5A) can be given by the following formula.

$$\mathrm{ABS}(fs/\alpha 1 - fs) \qquad \text{(formula 1)}$$

In order to shift the folding back component of the fundamental wave having the greatest influence out of the band of the spatial frequency (fd/2) of the display unevenness, the following formula may be satisfied.

$$(fd/2) \le \mathrm{ABS}(fs/\alpha 1 - fs) \qquad \text{(formula 2)}$$

When formula 2 is solved for $\alpha 1$ using $\alpha 1 = fs/fd$ from the above assumption, the following formula is obtained.

$$1.5 \le \alpha 1 \qquad \text{(formula 3)}$$

On the other hand, in the case of $\alpha 1 > 2$, a high-resolution image pickup element is required, which is inferior from the viewpoint of cost. Thus, for example, magnification $\alpha 1$ may be determined so as to satisfy $1.5 \le \alpha 1 \le 2$.

Image quality adjustment device 40 also includes correction table generator 45 that generates the correction table for correcting the luminance of display panel 20 using the first image in which at least the spatial frequency component greater than or equal to fd/2 is removed.

This allows prevention of the luminance unevenness of display panel 20.

As described above, the image quality adjustment method includes the step of controlling display panel 20 including the plurality of pixels 21d, each including the arrangement of the plurality of subpixels 21a to 21c, such that display panel 20 displays the measurement image in which a part of the plurality of pixels 21a to 21c is lit (S10), and the step of removing at least the spatial frequency component greater than or equal to fd/2 from the image obtained by capturing the measurement image displayed on display panel 20 using capture device 30 when the panel spatial frequency determined by pixel pitch p of pixels 21d in the arrangement of the plurality of subpixels 21a to 21c is set to fd (S13).

Modification of First Exemplary Embodiment

An image quality adjustment system according to a modification of the first exemplary embodiment will be described below with reference to FIG. 6. In the modification, a point different from the first exemplary embodiment will be described, and the configuration similar to that of the first exemplary embodiment may be omitted or simplified.

FIG. 6 is a block diagram illustrating a configuration of image quality adjustment system 10a of the modification of the first exemplary embodiment.

As illustrated in FIG. 6, in the modification, the configuration of capture device 30a is different from that of the first exemplary embodiment. Specifically, capture device 30a includes optical filter 31.

For example, optical filter 31 is a low-pass filter that removes the spatial frequency component greater than or equal to a half of sampling frequency fs of capture device 30a. Optical filter 31 is implemented with an optical low-pass filter in which a birefringence plate is used or an optical low-pass filter in which a diffraction grating is used. For example, the optical low-pass filter in which the birefringence plate is used is disposed between the lens of capture device 30a and the light receiving element. For example, the optical low-pass filter in which the diffraction grating is used is disposed on the side of display panel 20 (in front of the lens) of the lens.

As described above, image quality adjustment system 10a includes image quality adjustment device 40 and capture device 30a that outputs to image quality adjustment device 40 the image obtained by capturing the image of display panel 20. Capture device 30a includes optical filter 31 that removes the spatial frequency component greater than or equal to a half of sampling frequency fs of capture device 30a.

Consequently, the spatial frequency component greater than or equal to a half (that is, the Nyquist frequency) of sampling frequency fs of capture device 30a can be reduced, so that the moire included in the captured image generated by capture device 30a can further be reduced.

Second Exemplary Embodiment

[2-1. Configuration of Image Quality Adjustment System]

An image quality adjustment system according to a second exemplary embodiment will be described below with reference to FIGS. 7 and 8. In the second exemplary embodiment, a point different from the first exemplary embodiment will be described, and the configuration similar to that of the first exemplary embodiment may be omitted or simplified.

In the second exemplary embodiment, the sampling frequency of capture device 30 differs from that of the first exemplary embodiment. Specifically, capture controller 41 controls sampling frequency fs of capture device 30 to a value smaller than panel spatial frequency fd of display panel 20.

Figure 7:
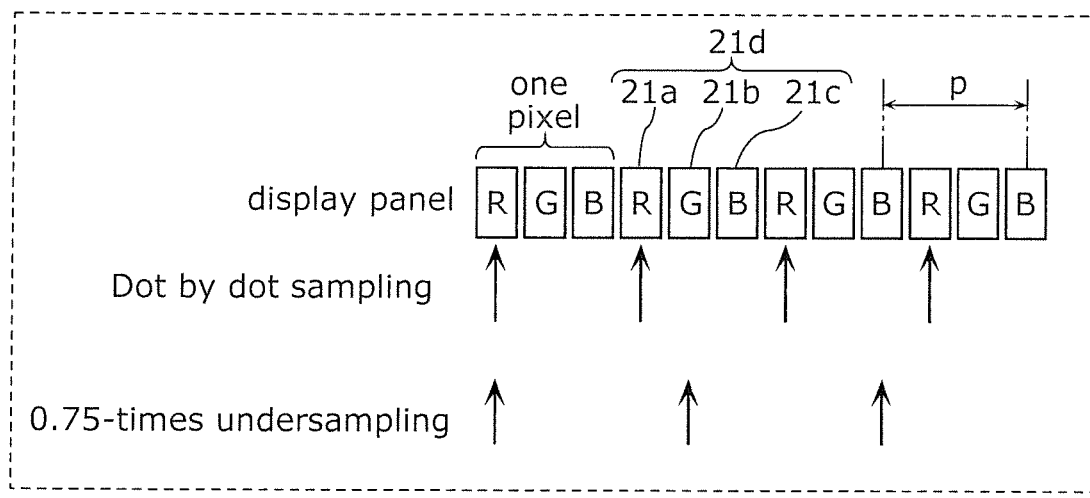
FIG. 7 is a view illustrating a spatial sampling frequency of an capture device according to a second exemplary embodiment.

FIG. 7 is a view illustrating the spatial sampling frequency of capture device 30 of the second exemplary embodiment; "Dot by dot sampling" in FIG. 7 is similar to that of the first exemplary embodiment, and the description will be omitted.

As illustrated in FIG. 7, "0.75-times undersampling" illustrates the case where sampling frequency fs of capture device 30 is set to 0.75 times panel spatial frequency fd of display panel 20. That is, capture device 30 samples display panel 20 with a pitch greater than pixel pitch p of display panel 20. In the second exemplary embodiment, capture controller 41 controls sampling frequency fs of capture device 30 to 0.75 times panel spatial frequency fd. Alternatively, capture controller 41 may control sampling frequency fs of capture device 30 to a different value that is smaller than panel spatial frequency fd of display panel 20. For example, capture controller 41 may control sampling frequency fs of capture device 30 to 0.8 times panel spatial frequency fd.

The moire included in the image obtained by capturing the image of display panel 20 using capture device 30 when sampling frequency fs of capture device 30 is set to 0.75 times panel spatial frequency fd will be described below with reference to FIG. 8.

Figure 8:
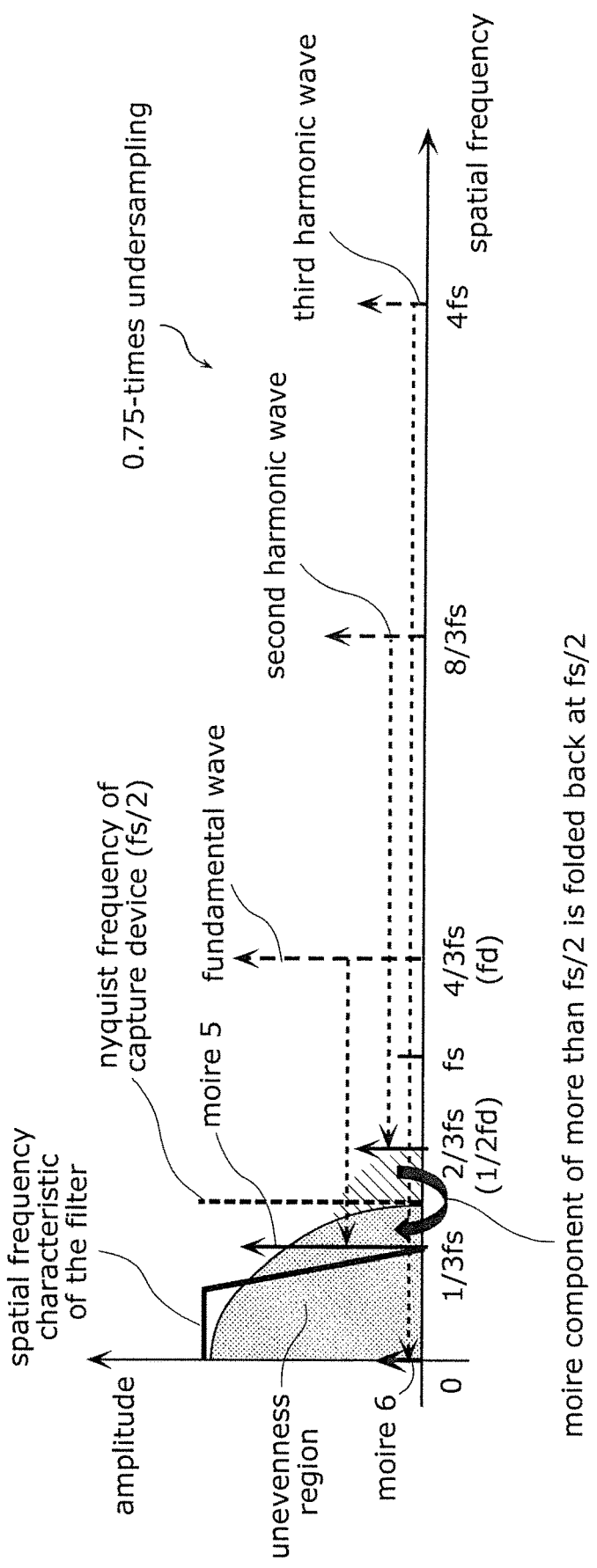
FIG. 8 is a view illustrating the moire components during 0.75-times undersampling of the second exemplary embodiment.

FIG. 8 is a view illustrating the moire components during the 0.75-times undersampling of the second exemplary embodiment.

As illustrated in FIG. 8, the fundamental wave, the second harmonic wave, and the third harmonic wave are components caused by the structure of display panel 20. Moires 5 and 6 indicate the spatial frequency component in which the fundamental wave, the second harmonic wave, and the third harmonic wave are folded back at the Nyquist frequency.

The fundamental wave is the spatial frequency component generated at the spatial frequency of 4/3·fs (=fd), and is the component caused by performing the green raster display on display panel 20. The second harmonic wave is a harmonic component generated at a spatial frequency of (8/3·fs) 2 times the fundamental wave, and the third harmonic wave is a harmonic component generated at a spatial frequency of (4·fs) 3 times the fundamental wave. The second harmonic wave and the third harmonic wave are harmonic components of the fundamental wave, and are attenuated. That is, amplitudes of the second harmonic wave and the third harmonic wave are smaller than amplitude of the fundamental wave.

Moire 5 generated at the spatial frequency of fs/3 is generated by the component that is generated by folding back the fundamental wave at the Nyquist frequency and the component that is generated by folding back the second harmonic wave at the Nyquist frequency. Moire 5 exists within the spatial frequency region (unevenness region in FIG. 8) of the luminance unevenness of display panel 20. The amplitude of moire 5 depends on the amplitude of the fundamental wave having the largest amplitude among the fundamental wave, the second harmonic wave, and the third harmonic wave. That is, the amplitude of moire 5 is larger than that of moire 6.

Moire 6 generated at the spatial frequency of zero is the component generated by folding back the third harmonic wave at the Nyquist frequency. Moire 6 exists within the spatial frequency region of the luminance unevenness of display panel 20. The amplitude of moire 6 depends on the amplitude of the third harmonic wave having the smallest amplitude among the fundamental wave, the second harmonic wave, and the third harmonic wave. That is, the amplitude of moire 6 is smaller than that of moire 5.

The spatial frequency at which the fundamental wave, the second harmonic wave, and the third harmonic wave are generated varies depending on the setting value of the sampling frequency of capture device 30. That is, the spatial frequency at which the moire is generated varies.

Assuming that $\alpha 1$ is the magnification of sampling frequency $fs1$ with respect to panel spatial frequency $fd$, and that n1-n3 are the coefficient, the moire component of the fundamental wave folded back at the Nyquist frequency is given by the following formula.

$$\text{ABS}(fs1/\alpha 1 - n1 \times fs1) \qquad \text{(formula 4)}$$

ABS indicates a function obtaining an absolute value. Where coefficient n1 in formula 4 is an integer satisfying the following formula.

$$\text{ABS}(fs1/\alpha 1 - n1 \times fs1) \leq fs1/2 \qquad \text{(formula 5)}$$

In the second exemplary embodiment, $fs1/\alpha 1$ is 4/3·fs. Coefficient n1 satisfying formula 5 becomes 1, and formula 4 becomes 1/3·fs. That is, moire 5 in FIG. 8 includes the moire component in which the fundamental wave is folded back at the Nyquist frequency.

The moire component in which the second harmonic wave is folded back at the Nyquist frequency is given by the following formula.

$$\text{ABS}(2fs1/\alpha 1 - n2 \times fs1) \qquad \text{(formula 6)}$$

Where coefficient n2 in formula 6 is an integer satisfying the following formula.

$$\text{ABS}(2fs1/\alpha 1 - n2 \times fs1) \leq fs1/2 \qquad \text{(formula 7)}$$

In the second exemplary embodiment, $2fs1/\alpha 1$ is 8/3·fs. Coefficient n2 satisfying formula 7 becomes 3, and formula 6 becomes 1/3·fs. That is, moire 5 in FIG. 8 includes the moire component in which the second harmonic wave is folded back at the Nyquist frequency.

The moire component in which the third harmonic wave is folded back at the Nyquist frequency is given by the following formula.

$$\text{ABS}(3fs1/\alpha1 - n3 \times fs1) \quad \text{(formula 8)}$$

Where coefficient n3 in formula 8 is an integer satisfying the following formula.

$$\text{ABS}(3fs1/\alpha1 - n3 \times fs1) < fs1/2 \quad \text{(formula 9)}$$

In the second exemplary embodiment, $3fs1/\alpha1$ is $4 \cdot fs$. Coefficient n3 satisfying formula 9 becomes 4, and formula 8 becomes zero. That is, as illustrated in FIG. 8, the moire component in which the third harmonic wave is folded back at the Nyquist frequency becomes moire 6.

As described above, coefficients n1-n3 included in formulas 4, 6, and 8 are independent of one another, and, for example, at least a part of coefficients n1-n3 may be a different value. Formulas 4 to 9 are only by way of example, and the spatial frequency of the moire may be calculated by another formula.

From formulas 4, 6, and 8, when magnification $\alpha1$ is smaller than 1, the moire components of the fundamental wave, the second harmonic wave, and the third harmonic wave are generated at the spatial frequency smaller than $1/2 \cdot fs$. For this reason, the moire generated in the captured image can be reduced by removing the moire component. For example, the spatial frequency component greater than or equal to the largest value of formulas 4, 6, and 8 may be removed from the captured image. Specifically, filter 44 may be a filter that removes the spatial frequency components greater than or equal to the largest value of formulas 4, 6, and 8 from the captured image. In the second exemplary embodiment, filter 44 is the low-pass filter that removes the spatial frequency component greater than or equal to $1/3 \cdot fs$.

Filter 44 may be a filter that removes the region of the spatial frequency greater than or equal to the spatial frequency of the moire in which the fundamental wave is folded back at the Nyquist frequency. Specifically, when the value calculated by formula 4 becomes the minimum, namely, when formula 4 is coefficient n1 satisfying $1/2 \cdot fs$, filter 44 removes the spatial frequency component greater than or equal to the value.

As illustrated in FIG. 8, the display unevenness component generated in the spatial frequency region (specifically, the frequency region greater than or equal to $1/2 \cdot fs$ and less than or equal to $1/2 \cdot fd$) greater than the Nyquist frequency is also folded back at the Nyquist frequency.

As described above, image quality adjustment device 40 further includes capture controller 41 that controls the spatial sampling frequency of capture device 30 to sampling frequency fs (an example of the first spatial sampling frequency) that is determined by the pixel pitch of capture device 30. When magnification of sampling frequency fs1 (fs) with respect to panel spatial frequency fd is set to $\alpha1$, capture controller 41 controls sampling frequency fs1 such that magnification $\alpha1$ is smaller than 1. Filter 44 (an example of the first electric filter) removes the spatial frequency component greater than or equal to the largest value among $\text{ABS}(fs1/\alpha1-n1 \times fs1)$, $\text{ABS}(2fs1/\alpha1-n2 \times fs1)$, and $\text{ABS}(3fs1/\alpha1-n3 \times fs1)$ from the captured image when the sampling frequency is set to fs1. Where coefficient n1 is an integer satisfying $\text{ABS}(fs1/\alpha1-n1 \times fs1) < fs1/2$, coefficient n2 is an integer satisfying $\text{ABS}(2fs1/\alpha1-n2 \times fs1) < fs1/2$, and coefficient n3 is an integer satisfying $\text{ABS}(3fs1/\alpha1-n3 \times fs1) < fs1/2$.

Consequently, the moire components existing in the spatial frequency region ("unevenness region" in FIG. 8) of the display unevenness of display panel 20 during undersampling can be removed while preventing the influence on the display unevenness. In the case where the moire component of the third harmonic exists in the unevenness region, the moire component has the small influence. Thus, image quality adjustment device 40 can further reduce the moire generated in the captured image. The number of pixels necessary for capture device 30 can be reduced, so that more inexpensive image quality adjustment system 10 can be achieved.

Filter 44 (an example of the first electric filter) removes the spatial frequency component greater than or equal to $\text{ABS}(fs1/\alpha1-n1 \times fs1)$ when coefficient n1 is set to a value at which $\text{ABS}(fs1/\alpha1-n1 \times fs1)$ becomes the minimum value.

This allows removal of the moire component generated by folding back the fundamental wave having the large influence on the moire during the undersampling. Thus, image quality adjustment device 40 can further reduce the moire generated in the captured image.

Third Exemplary Embodiment

An image quality adjustment system according to a third exemplary embodiment will be described below with reference to FIGS. 9 to 13C. In the third exemplary embodiment, a point different from the first exemplary embodiment will be described, and the configuration similar to that of the first exemplary embodiment may be omitted or simplified.

In the third exemplary embodiment, the sampling frequency of capture device 30 differs from that of the first exemplary embodiment. Capture device 30 captures the measurement image displayed on display panel 20 at a plurality of kinds of sampling frequencies. Specifically, capture controller 41 controls sampling frequency fs of capture device 30 to a plurality of values. Capture device 30 captures the image of display panel 20 that displays the measurement image at a plurality of different sampling frequencies. An example in which capture device 30 captures the measurement image displayed on display panel 20 at two kinds of sampling frequencies will be described below.

[3-1. Configuration of Image Quality Adjustment System]

A configuration of image quality adjustment system 100 of the third exemplary embodiment will be described with reference to FIG. 9.

Figure 9:
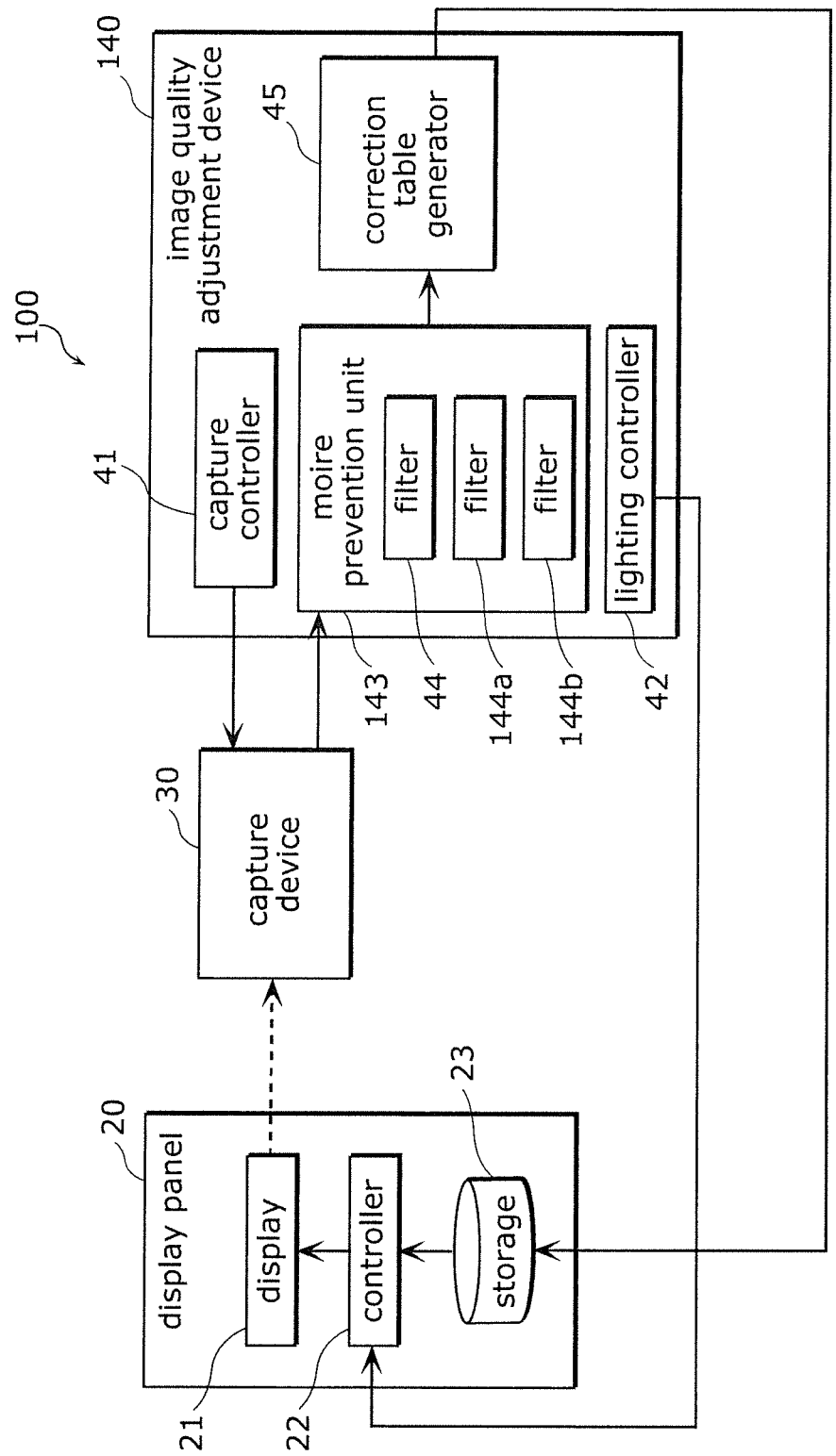
FIG. 9 is a block diagram illustrating a configuration of an image quality adjustment system according to a third exemplary embodiment.

FIG. 9 is a block diagram illustrating a configuration of an image quality adjustment system 100 of the third exemplary embodiment.

As illustrated in FIG. 9, in the third exemplary embodiment, the configuration of moire prevention unit 143 of image quality adjustment device 140 is different from that of image quality adjustment device 40 of the first exemplary embodiment. More specifically, moire prevention unit 143 includes filter 144a and filter 144b in addition to filter 44. For example, filter 144a and filter 144b are electric filters different from each other in at least a part of the spatial frequency band to be removed.

Filter 144a is an electric filter that removes the moire component existing in the spatial frequency region of the display unevenness of display panel 20 from the image (for example, the first image) captured at one of different sampling frequencies. Filter 144b is an electric filter that removes the moire component existing in the spatial frequency region of the display unevenness of display panel 20 from the image (for example, the second image) captured at the other of different sampling frequencies. For example, the filters 144a and 144b are configured with a band-pass filter, a band elimination filter, a low-pass filter, or a high-pass filter.

The spatial sampling frequency of capture device 30 will be described below with reference to FIG. 10.

Figure 10:
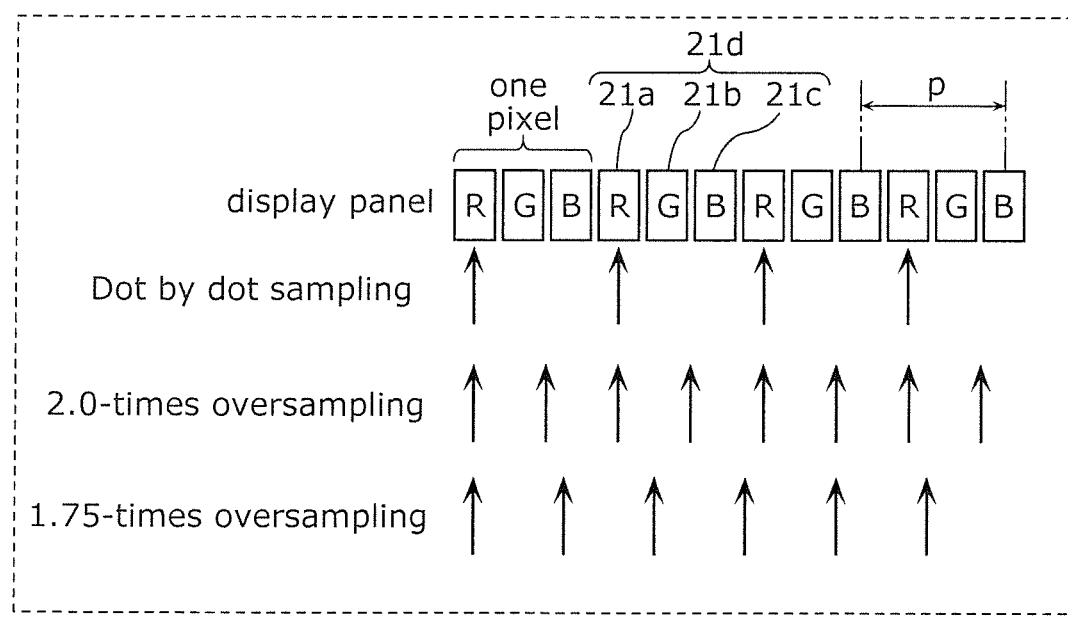
FIG. 10 is a view illustrating a spatial sampling frequency of an capture device of the third exemplary embodiment.

FIG. 10 is a view illustrating the spatial sampling frequency fs of capture device 30 of the third exemplary embodiment. "Dot by dot sampling" in FIG. 10 is similar to that of the first exemplary embodiment, and the description will be omitted.

As illustrated in FIG. 10, in the third exemplary embodiment, capture device 30 captures the image of display panel 20 at two sampling frequencies fs of "2.0-times oversampling" and "1.75-times oversampling". "2.0-times oversampling" illustrates the case where sampling frequency fs of capture device 30 is set to 2.0 times panel spatial frequency fd of display panel 20. That is, capture device 30 samples display panel 20 with a pitch narrower than pixel pitch p of display panel 20. The sampling frequency which is 2.0 times the panel spatial frequency is an example of the first spatial sampling frequency. In the third exemplary embodiment, when the magnification of the first spatial sampling frequency with respect to panel spatial frequency fd is set to α1, magnification α1 is an integer. Specifically, magnification α1 is 2.

"1.75-times oversampling" illustrates the case where sampling frequency fs of capture device 30 is set to 1.75 times panel spatial frequency fd of display panel 20. That is, capture device 30 samples display panel 20 with a pitch narrower than pixel pitch p of display panel 20. The sampling frequency fs which is 1.75 times panel spatial frequency fd is an example of a second spatial sampling frequency. In the third exemplary embodiment, when the magnification of the second spatial sampling frequency with respect to panel spatial frequency fd is set to α2, magnification α2 is a noninteger. Specifically, magnification α2 is 1.75.

The first and second spatial sampling frequencies are not limited to the above frequencies. Both the first and second spatial sampling frequencies are the spatial sampling frequencies that are oversampled, but the present disclosure is not limited to this configuration. At least one of the first and second spatial sampling frequencies may be a spatial sampling frequency that is undersampled, or may be identical to panel spatial frequency fd. The present disclosure is not limited to magnification α1 that is an integer and magnification α2 that is a noninteger. At least one of magnification α1 and magnification α2 may be a noninteger. During the undersampling, the integer and noninteger of the magnification are determined by 1/α1.

The moire included in the image obtained by capturing the image of display panel 20 using capture device 30 when sampling frequency fs of capture device 30 is set to 2.0 times and 1.75 times panel spatial frequency fd will be described below with reference to FIGS. 11A and 11B.

Figure 11A:
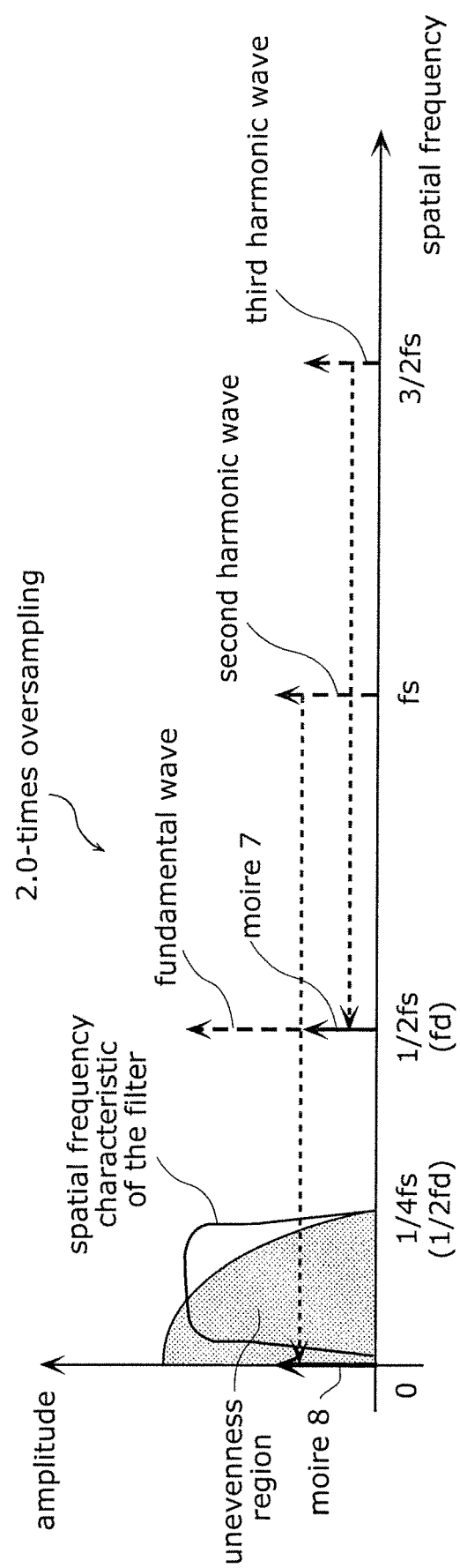
FIG. 11A is a view illustrating the moire component during 2.0-times oversampling of the third exemplary embodiment.

FIG. 11A is a view illustrating the moire component during the 2.0-times oversampling of the third exemplary embodiment. Specifically, FIG. 11A illustrates the spatial frequency distribution in the first image that is obtained by the image capturing when capture device 30 performs the 2.0-times oversampling.

As illustrated in FIG. 11A, the fundamental wave, the second harmonic wave, and the third harmonic wave are components caused by the structure of display panel 20. Moires 7 and 8 indicate the spatial frequency component in which the fundamental wave, the second harmonic wave, and the third harmonic wave are folded back at the Nyquist frequency.

The fundamental wave is the spatial frequency component generated at the spatial frequency of 1/2·fs (=fd), and is the component caused by performing the green raster display on display panel 20. The second harmonic wave is a harmonic component generated at a spatial frequency of (fs) 2 times the fundamental wave, and the third harmonic wave is a harmonic component generated at a spatial frequency of (3/2·fs) 3 times the fundamental wave. The second harmonic wave and the third harmonic wave are harmonic components of the fundamental wave, and are attenuated. That is, amplitudes of the second harmonic wave and the third harmonic wave are smaller than amplitude of the fundamental wave.

Moire 7 generated at the spatial frequency of 1/2·fs is the component generated by folding back the third harmonic wave at the Nyquist frequency. Moire 7 exists outside the spatial frequency region (unevenness region in FIG. 11A) of the luminance unevenness of display panel 20. The amplitude of moire 7 depends on the amplitude of the third harmonic wave. That is, the amplitude of moire 7 is smaller than that of moire 8. The fundamental wave also exists at the spatial frequency of 1/2·fs, so that the amplitude of the spatial frequency component generated at 1/2·fs is determined by the fundamental wave and moire 7.

Moire 8 generated at the spatial frequency of zero is the component generated by folding back the second harmonic wave at the Nyquist frequency. Moire 8 exists within the unevenness region of display panel 20. The amplitude of moire 8 depends on the amplitude of the second harmonic wave. Moire 8 is an example of a first moire component.

Filter 144a is an electric filter that removes moire 8 generated in the unevenness region from the first image. As illustrated in FIG. 11A, filter 144a removes the spatial frequency component including the spatial frequency of zero. For example, filter 144a is a band-pass filter having a pass band ranging from a vicinity of the spatial frequency of zero to 1/4·fs. In other words, filter 144a removes the spatial frequency component in the vicinity of the spatial frequency of zero and the spatial frequency component greater than or equal to 1/4·fs (1/2·fd). That is, filter 144a is an electric filter having functions of the first electric filter that removes at least the spatial frequency component greater than or equal to fd/2 and a second electric filter that removes moire 8, which is the spatial frequency component of the moire included in the first image captured at the first spatial sampling frequency and exists in the spatial frequency region of the display unevenness of display panel 20. Filter 144a may be a high-pass filter having a cutoff frequency in the vicinity of the spatial frequency of zero. In this case, filter 144a is an example of the second electric filter that removes moire 8.

The spatial frequency distribution of the first image from which the predetermined spatial frequency component is removed by filter 144a that is the first electric filter and the second electric filter will be described with reference to FIG. 12A.

Figure 12A:
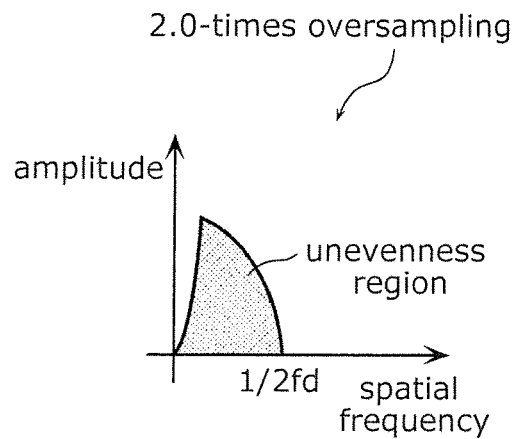
FIG. 12A is a view illustrating a spatial frequency characteristic of a first image after moire removal during the 2.0-times oversampling of the third exemplary embodiment.

FIG. 12A is a view illustrating the spatial frequency characteristic of the first image after the moire removal during the 2.0-times oversampling of the third exemplary embodiment.

As illustrated in FIG. 12A, the vicinity of the spatial frequency of zero and the high-frequency component (for example, the component greater than or equal to 1/2·fd) are removed from the first image. In the spatial frequency distribution of FIG. 12A, because data in the vicinity of the spatial frequency of zero does not exist, accurate display unevenness data of display panel 20 can hardly be obtained. For this reason, capture device 30 performs the image capturing again at the second spatial sampling frequency different from the first spatial sampling frequency.

The second spatial sampling frequency is set such that the spatial frequency of the moire generated in the unevenness region at the second spatial sampling frequency is generated at the spatial frequency different from the spatial frequency of the moire generated in the unevenness region at the first spatial sampling frequency. As described above, in the case where magnification α1 (during the undersampling, 1/α1) is an integer, the moire component is mainly generated in the vicinity of the spatial frequency of zero. In the case where magnification α2 (during the undersampling, 1/α2) is a noninteger, the moire component is mainly generated at the spatial frequency other than zero. For example, in the case where magnification α2 is a noninteger, the amplitude of the moire component generated in the vicinity of the spatial frequency of zero is reduced as the compared with the case where magnification α2 is an integer. Thus, in the case where magnification α1 is an integer, the second spatial sampling frequency may be set such that magnification α2 is a noninteger. In the third exemplary embodiment, the second sampling frequency is 1.75 times the panel spatial frequency.

Figure 11B:
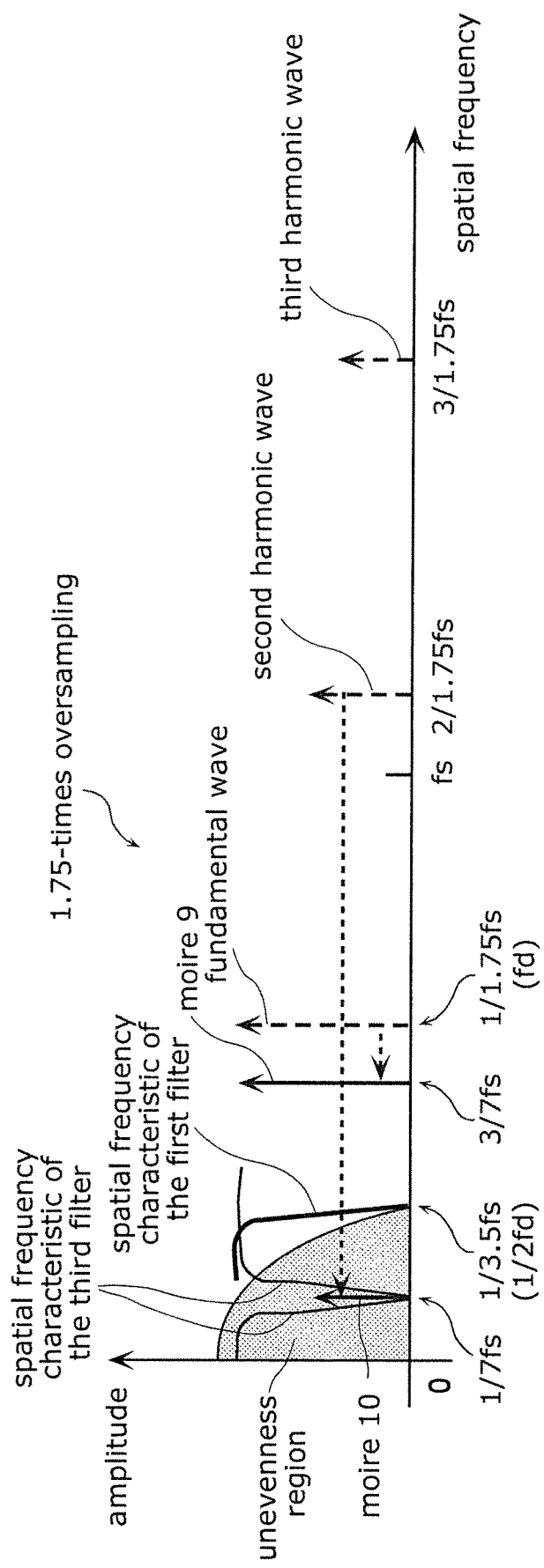
FIG. 11B is a view illustrating the moire component during 1.75-times oversampling of the third exemplary embodiment.

FIG. 11B is a view illustrating the moire component during the 1.75-times oversampling of the third exemplary embodiment. Specifically, FIG. 11B illustrates the spatial frequency distribution in the second image obtained by the image capturing using capture device 30 in performing the 1.75-times oversampling.

As illustrated in FIG. 11B, the fundamental wave, the second harmonic wave, and the third harmonic wave are components caused by the structure of display panel 20. Moires 9 and 10 indicate the component in which the fundamental wave, the second harmonic wave, and the third harmonic wave are folded back at the Nyquist frequency.

The fundamental wave is a frequency component generated at the spatial frequency of 1/1.75·fs (=fd), and is a component caused by performing the green raster display on display panel 20. The second harmonic wave is a harmonic component generated at a spatial frequency of (2/1.75·fs) 2 times the fundamental wave, and the third harmonic wave is a harmonic component generated at a spatial frequency of (3/1.75·fs) 3 times the fundamental wave. The second harmonic wave and the third harmonic wave are harmonic components of the fundamental wave, and are attenuated. That is, amplitudes of the second harmonic wave and the third harmonic wave are smaller than amplitude of the fundamental wave.

Moire 9 generated at the spatial frequency of 3/7·fs is the component generated by folding back the fundamental wave at the Nyquist frequency. Moire 9 exists outside the spatial frequency region (unevenness region in FIG. 11B) of the luminance unevenness of display panel 20. The amplitude of moire 9 depends on the amplitude of the fundamental wave. That is, the amplitude of the moire 9 is larger than that of moire 10.

Moire 10 generated at the spatial frequency of 1/7·fs is the component generated by folding back the second harmonic wave at the Nyquist frequency. Moire 10 exists within the unevenness region of display panel 20. The amplitude of moire 10 depends on the amplitude of the second harmonic wave. Moire 10 is an example of a second moire component.

The moire component in which the third harmonic wave is folded back at the Nyquist frequency has a level at which the influence on the display unevenness is substantially negligible, and the illustration is omitted.

Filter 144b is an electric filter that removes moire 10 generated in the unevenness region from the second image. As illustrated in FIG. 11B, filter 144b removes the spatial frequency component including the spatial frequency of 1/7·fs. For example, filter 144b is a band elimination filter in which the spatial frequency of 1/7·fs is set to the center frequency of the attenuation band. Filter 144b is an example of a third electric filter that removes moire 10, which is the spatial frequency component of the moire included in the second image captured at the second spatial sampling frequency and exists in the spatial frequency region of the luminance unevenness. Filter 144b is different from that of filter 144a in the spatial frequency band to be removed.

In the case where magnification α2 is a noninteger, the spatial frequency at which the fundamental wave, the second harmonic wave, and the third harmonic wave are generated varies depending on the setting value of the sampling frequency of capture device 30. That is, the spatial frequency at which the moire is generated varies.

Assuming that α2 is the magnification of sampling frequency fs2 with respect to panel spatial frequency fd and that n4-n6 are the coefficient, the moire component of the fundamental wave folded back at the Nyquist frequency is given by the following formula.

$$ABS(fs2/\alpha2 - n4 \times fs2) \qquad \text{(formula 10)}$$

Where coefficient n4 in formula 10 is an integer satisfying the following formula.

$$ABS(fs2/\alpha2 - n4 \times fs2) < fs2/2 \qquad \text{(formula 11)}$$

In the third exemplary embodiment, fs2/α2 is 1/1.75·fs. Coefficient n4 satisfying formula 11 becomes 1, and formula 10 becomes 3/7·fs. That is, as illustrated in FIG. 11B, the moire component in which the fundamental wave is folded back at the Nyquist frequency becomes moire 9.

The moire component in which the second harmonic wave is folded back at the Nyquist frequency is given by the following formula.

$$ABS(2fs2/\alpha2 - n5 \times fs2) \qquad \text{(formula 12).}$$

Where coefficient n5 in formula 12 is an integer satisfying the following formula.

$$ABS(2fs2/\alpha2 - n5 \times fs2) < fs2/2 \qquad \text{(formula 13)}$$

In the third exemplary embodiment, 2fs2/α2 is 2/1.75·fs. Coefficient n5 satisfying formula 13 becomes 1, and formula 12 becomes 1/7·fs. That is, as illustrated in FIG. 11B, the moire component in which the second harmonic wave is folded back at the Nyquist frequency becomes moire 10.

The moire component in which the third harmonic wave is folded back at the Nyquist frequency is given by the following formula.

$$ABS(3fs3/\alpha3 - n6 \times fs3) \qquad \text{(formula 14)}$$

Where coefficient n6 in formula 14 is an integer satisfying the following formula.

$$ABS(3fs2/\alpha2 - n6 \times fs2) < fs2/2 \qquad \text{(formula 15)}$$

In the third exemplary embodiment, 3fs2/α2 is 3/1.75·fs. Coefficient n6 satisfying formula 15 becomes 2, and formula 14 becomes 2/7·fs.

As described above, coefficients n4-n6 included in formulas 10, 12, and 15 are independent of one another, and, for example, at least a part of coefficients n4-n6 may be a different value. Formulas 10 to 15 are only by way of example, and the spatial frequency of the moire may be calculated by another formula.

The spatial frequency distribution of the second image from which the predetermined spatial frequency component is removed by filters 44 and 144b will be described with reference to FIG. 12B.

Figure 12B:
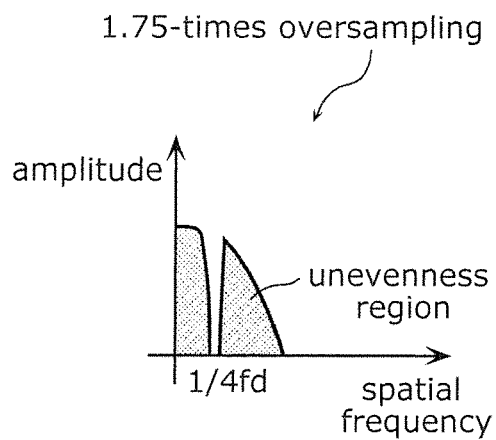
FIG. 12B is a view illustrating a spatial frequency characteristic of a second image after moire removal during the 1.75-times oversampling of the third exemplary embodiment.

FIG. 12B is a view illustrating the spatial frequency characteristic of the second image after the moire removal during the 1.75-times oversampling of the third exemplary embodiment.

As illustrated in FIG. 12B, the vicinity of the spatial frequency of 1/4·fd (the spatial frequency of 1/7·fs in FIG. 11B) and the high-frequency component (for example, the component greater than or equal to 1/2·fd) are removed from the second image. Specifically, filter 44 removes the spatial frequency component greater than or equal to 1/2·fd (the spatial frequency of 1/3.5·fs in FIG. 11B) from the second image. Filter 44 is an example of the first filter. Filter 144b removes the spatial frequency component in the vicinity of the spatial frequency 1/4·fd (the spatial frequency of 1/7·fs in FIG. 11B) from the second image.

Correction table generator 45 generates a synthesis image in which the first and second images from which the moire is removed by filters 44, 144a, and 144b are synthesized, and calculates the correction table from the synthesis image. The spatial frequency distribution of the synthesis image will be described with reference to FIG. 12C.

Figure 12C:
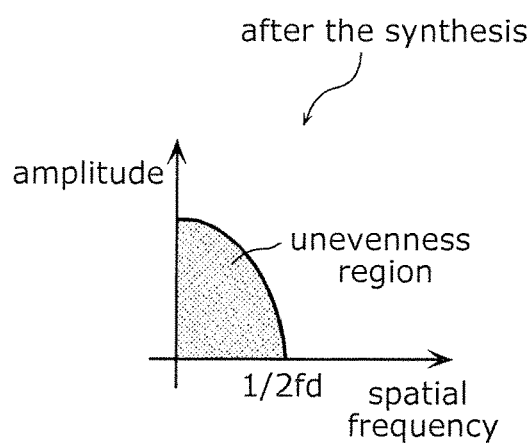
FIG. 12C is a view illustrating the spatial frequency characteristic after synthesis of the third exemplary embodiment.

FIG. 12C is a view illustrating the spatial frequency characteristic after the synthesis of the third exemplary embodiment.

The spatial frequency distribution after the synthesis in which the moire component is removed in the unevenness region is obtained as illustrated in FIG. 12C. This allows the generation of the captured image (unevenness captured image) in which the moire is further reduced.

[3-2. Processing of Image Quality Adjustment System]

The processing of image quality adjustment system 100 will be described below with reference to FIG. 13.

Figure 13:
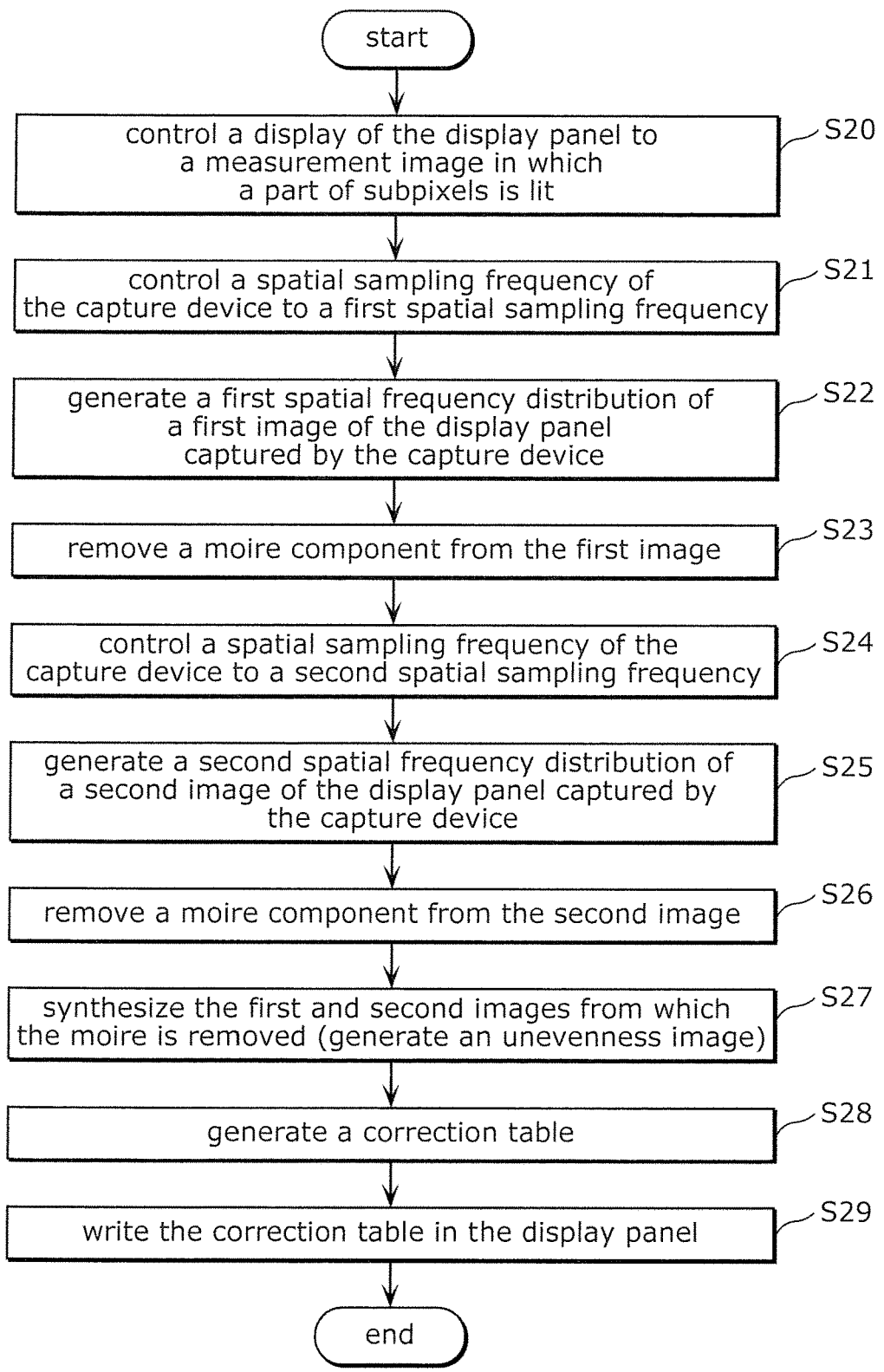
FIG. 13 is a flowchart illustrating an example of processing of the image quality adjustment device of the third exemplary embodiment.

FIG. 13 is a flowchart illustrating an example of the processing of image quality adjustment device 140 of the third exemplary embodiment.

As illustrated in FIG. 13, image quality adjustment device 140 controls the display of display panel 20 to the measurement image in which a part of the subpixels (for example, subpixels 21b) is lit (S20). Specifically, lighting controller 42 causes the display panel to display the measurement image in which only subpixel 21b among the plurality of subpixels 21a to 21c of display panel 20 is lit. Consequently, for example, display panel 20 displays the image in which the whole surface is green. Lighting controller 42 outputs to display panel 20 the image signal in which the plurality of subpixels 21b include the identical gradation value.

Subsequently, image quality adjustment device 140 controls the sampling frequency of capture device 30 to the first spatial sampling frequency (S21). In the third embodiment, capture controller 41 controls the magnification of the lens of capture device 30 such that the sampling frequency of capture device 30 is 2.0 times the panel spatial frequency of display panel 20. Capture device 30 captures the image of display panel 20 that displays the measurement image.

Subsequently, image quality adjustment device 140 generates a first spatial frequency distribution of the captured image (an example of the first image) obtained by capturing the image of display panel 20 captured at a first sampling frequency using capture device 30 (S22). Specifically, moire prevention unit 143 generates the spatial frequency distribution of the captured image from the captured image acquired from capture device 30 (see FIG. 11A). Image quality adjustment device 140 removes the moire component from the first image (S23). Specifically, moire prevention unit 143 removes at least the moire component existing in the unevenness region generated by the display unevenness of display panel 20 from the first image. For example, filter 144a removes the spatial frequency component in the vicinity of the spatial frequency of zero and the spatial frequency component greater than or equal to fd/2 from the first image.

Subsequently, image quality adjustment device 140 controls the sampling frequency of capture device 30 to the second spatial sampling frequency (S24). That is, the sampling frequency of capture device 30 is changed from the first spatial sampling frequency to the second sampling frequency. Specifically, capture controller 41 controls the magnification of the lens of capture device 30 such that the sampling frequency of capture device 30 is 1.75 times the panel spatial frequency of display panel 20. Capture device 30 captures the image of display panel 20 that displays the measurement image. At this point, lighting controller 42 does not change the display on display panel 20. That is, capture device 30 captures the identical measurement image when capturing the image of display panel 20 at the first spatial sampling frequency, and when capturing the image of display panel 20 at the second spatial sampling frequency.

Subsequently, image quality adjustment device 140 generates a second spatial frequency distribution of the captured image (an example of the second image) obtained by capturing the image of display panel 20 at the second sampling frequency using capture device 30 (S25). Specifically, moire prevention unit 143 generates the spatial frequency distribution of the captured image from the captured image acquired from capture device 30 (see FIG. 11B). Image quality adjustment device 140 removes the moire component from the second image (S26). Specifically, moire prevention unit 143 removes at least the moire component existing in the unevenness region generated by the display unevenness of display panel 20 from the second image. For example, filters 44 and 144b remove the spatial frequency component in the vicinity of the spatial frequency of zero and the spatial frequency component greater than or equal to fd/2 from the second image.

Subsequently, image quality adjustment device 140 synthesizes the first and second images from which the moire is removed, and generates the unevenness image (S27). Steps S28 and S29 are similar to steps S14 and S15 in FIG. 4, and the description is omitted.

In the above description, by way of example, the high-frequency component greater than or equal to fd/2 is removed in steps S23 and S26. However, the present disclosure is not limited to this example. It is acceptable that at least the moire component (for example, moire 8 in FIG. 11A and moire 10 in FIG. 11B) existing in the unevenness region generated by the display unevenness of display panel 20 can be removed in each of steps S23 and S26. For example, the high-frequency component greater than or equal to fd/2 may be removed from the unevenness image by filter 44 after the unevenness image is generated.

As described above, capture controller 41 further controls the spatial sampling frequency of capture device 30 to the second spatial sampling frequency different from the first spatial sampling frequency. Image quality adjustment device 140 further includes filter 144a (an example of the second electric filter) that removes the first moire component, which is the spatial frequency component of the moire included in the first image captured at the first spatial sampling frequency and exists in the spatial frequency region of the display unevenness of display panel 20, and filter 144b (an example of the third electric filter) that removes the second moire component, which is the spatial frequency component of the moire included in the second image captured at the second spatial sampling frequency and exists in the spatial frequency region of the display unevenness. The frequency band removed by filter 144a is different from the frequency band removed by filter 144b.

Consequently, even if the moire having a non-negligible level exists in the unevenness region generated by the display unevenness of display panel 20, the unevenness captured image from which the moire is removed can be generated by synthesizing at least two captured images (for example, the first and second images) from which the moire is removed, so that the moire can further be prevented. A degree of freedom of the spatial sampling frequency that can be set by capture device 30 is increased. For example, in a combination of display panel 20 and capture device 30, it is effective when the spatial sampling frequency cannot desirably be set.

When magnification α1 is an integer, and when the magnification of the second spatial sampling frequency with respect to panel spatial frequency fd is set to α2, magnification α2 is a noninteger.

Consequently, the folding back component (moire component) is generated while concentrating in the vicinity of the spatial frequency of zero (DC component) in the case where magnifications α1 and α2 (in the case of the undersampling, 1/α1) are integers, and the moire in the vicinity of the spatial frequency of zero (DC component) is reduced in the case where magnifications α1 and α2 (in the case of the undersampling, 1/α1) are nonintegers. Thus, the unevenness image in which moire is removed with higher accuracy can be generated by synthesizing the first image captured when magnification α1 is an integer and the second image captured when magnification α2 is a noninteger.

Filter 144a removes the spatial frequency component including the spatial frequency of zero, and filter 144b removes at least one of ABS(fs2/α2−n4×fs2), ABS(2fs2/α2−n5×fs2), and ABS(3fs2/α2−n6×fs2) when the second spatial frequency component is set to fs2. Where coefficient n4 is an integer satisfying ABS(fs2/α2−n4×fs2)<fs2/2, coefficient n5 is an integer satisfying ABS(2fs2/α2−n5×fs2)<fs2/2, and coefficient n6 is an integer satisfying ABS(3fs2/α2−n6×fs2)<fs2/2.

Consequently, in the case where magnification α1 is an integer, the folding back component (moire component) that is generated while concentrating in the vicinity of the spatial frequency of zero (DC component) can effectively be removed. In the case where magnification α2 is a noninteger, although the spatial frequency at which the moire is generated depends on the value of magnification α2, the moire can effectively be removed according to the spatial frequency.

Filter 44 further removes at least the spatial frequency component greater than or equal to fd/2 from the second image.

Consequently, the spatial frequency component greater than or equal to fd/2 can be removed even in the second image, so that the second image in which the moire is further prevented can be generated.

Filter 44 removes at least the spatial frequency component greater than or equal to fd/2 from each of the first and second images in the case where magnifications α1 and α2 are greater than 1.

This eliminates the necessity of the process of removing the predetermined spatial frequency component after the first and second images are synthesized.

In the case where magnifications α1 and α2 are greater than 1, filter 44 removes at least the spatial frequency component greater than or equal to fd/2 from the synthesis image in which the first image, from which the first moire component is removed, and the second image, from which the second moire component is removed, are synthesized.

Consequently, the process of removing the spatial frequency components greater than or equal to fd/2 can be performed at once.

Other Exemplary Embodiments

The image quality adjustment device, the image quality adjustment system, and the image quality adjustment method of the exemplary embodiments are described above, but the present disclosure is not limited to the exemplary embodiments.

For example, in the exemplary embodiments, the image quality adjustment device generates the correction table for correcting the luminance unevenness as the display unevenness. However, the present disclosure is not limited to this configuration. The image quality adjustment device may generate a correction table for correcting at least one of the luminance unevenness and color unevenness. For example, the image quality adjustment device may correct the luminance unevenness and the color unevenness by generating a correction table corresponding to the subpixel for each of the three subpixels. For example, the lighting controller lights only the subpixel that emits red light in the subpixels of the display panel, and the capture device captures the image of the display panel that displays the red image (an example of the measurement image). The image quality adjustment device generates the correction table corresponding to the subpixel that emits the red light from the image captured by the capture device. The similar processing is performed on the subpixels that emit green light and blue light, and the correction table corresponding to the subpixel that emits the green light and the correction table corresponding to the subpixel that emits the blue light are generated. Consequently, the correction tables corresponding to the three subpixels are generated.

In the exemplary embodiments, by way of example, the capture device includes the monochrome imaging element. However, the present disclosure is not limited to this configuration. For example, the capture device may include a color imaging element. In the case where the capture device includes the color imaging element, the correction table for correcting the luminance unevenness and the color unevenness can be generated by one-time measurement.

In the exemplary embodiments, by way of example, one pixel is constituted by three subpixels in the display panel. However, the present disclosure is not limited to this configuration. In the display panel, one pixel may be constituted by at least four subpixels. By way of example, the subpixel emits one of the three primary colors (red, green, and blue). However, the present disclosure is not limited to this configuration. At least one of the plurality of subpixels constituting the pixel may emit a color except for the three primary colors.

As in the third exemplary embodiment, in the case where the capture device captures the image of the display panel at a plurality of kinds of sampling frequencies, the lighting controller may not control the lighting state of the display panel so as to light a part of the plurality of subpixels. For example, the lighting controller may perform control such that all the plurality of subpixels are lit (for example, the white raster display is performed) in the case where the capture device captures the image of the display panel at a plurality of kinds of sampling frequencies.

Further, in the exemplary embodiments, each component may be configured with dedicated hardware, or may be implemented by executing a software program suitable for each component. Each component may be implemented by causing a program execution unit such as a processor to read and execute a software program recorded in a recording medium such as a hard disk and a semiconductor memory. The processor is configured with one or a plurality of electronic circuits including a semiconductor integrated circuit (IC) or a Large Scale Integration (LSI). The plurality of electronic circuits may be integrated in one chip, or provided in a plurality of chips. A plurality of chips may be integrated in one device, or provided in a plurality of devices.

Those skilled in the art will readily appreciate that many modifications are possible in the above exemplary embodiment and variations without materially departing from the novel teachings and advantages of the present disclosure. Accordingly, all such modifications are intended to be included within the scope of the present disclosure.

What is claimed is:

1. An image quality adjustment device comprising:
   a processor; and
   a non-transitory computer-readable medium having stored thereon executable instructions that, when executed by said processor, cause said image quality adjustment device to function as:
   a lighting controller that controls a display panel including a plurality of pixels, each of the plurality of pixels including a plurality of subpixels such that the display panel displays a measurement image in which a part of the plurality of subpixels is lit;
   a first electric filter that removes at least a spatial frequency component greater than or equal to fd/2 from a first image obtained by capturing the measurement image displayed on the display panel using a capture device when a panel spatial frequency determined by a pixel pitch of the pixel in a direction in which the plurality of subpixels are arrayed is set to fd; and
   a capture controller that controls a spatial sampling frequency of the capture device to a first spatial sampling frequency based on a pixel pitch of the capture device,
   wherein assuming that $\alpha 1$ is magnification of the first spatial sampling frequency with respect to the panel spatial sampling frequency fd, the capture controller controls the first spatial sampling frequency such that the magnification $\alpha 1$ is larger than 1.

2. The image quality adjustment device according to claim 1, wherein the capture controller controls the first spatial sampling frequency such that the magnification $\alpha 1$ falls within a range of $1.5 \leq \alpha 1 \leq 2$.

3. The image quality adjustment device according to claim 1, wherein
   the capture controller further controls the capture device to a second spatial sampling frequency different from the first spatial sampling frequency, and
   the executable instructions, when executed by said processor, cause said image quality adjustment device to further function as:
   a second electric filter that removes a first moire component, which is a spatial frequency component of moire included in the first image captured at the first spatial sampling frequency and exists in a spatial frequency region of the display unevenness of the display panel; and
   a third electric filter that removes a second moire component, which is a spatial frequency component of moire included in a second image captured at the second spatial sampling frequency and exists in the spatial frequency region of the display unevenness,
   a frequency band removed by the second electric filter and a frequency band removed by the third electric filter being different from each other.

4. The image quality adjustment device according to claim 3, wherein assuming that the magnification $\alpha 1$ is an integer and that the magnification of the second spatial sampling frequency with respect to the panel spatial frequency fd is set to $\alpha 2$, the magnification $\alpha 2$ is a noninteger.

5. The image quality adjustment device according to claim 4,
   wherein the second electric filter removes the spatial frequency component including the spatial frequency of zero,
   assuming that fs2 is the second spatial sampling frequency, the third electric filter removes at least one of ABS(fs2/$\alpha 2$−n4×fs2), ABS(2fs2/$\alpha 2$−n5×fs2), and ABS (3fs2/$\alpha 2$−n6×fs2),
   a coefficient n4 is an integer satisfying ABS(fs2/$\alpha 2$−n4× fs2)<fs2/2,
   a coefficient n5 is an integer satisfying ABS(2fs2/$\alpha 2$−n5× fs2)<fs2/2, and
   a coefficient n6 is an integer satisfying ABS(3fs2/$\alpha 2$−n6× fs2)<fs2/2, and
   wherein ABS indicates a function obtaining an absolute value.

6. The image quality adjustment device according to claim 3, wherein the first electric filter further removes at least the spatial frequency component greater than or equal to fd/2 from the second image.

7. The image quality adjustment device according to claim 6, wherein the first electric filter removes at least the spatial frequency component greater than or equal to fd/2 from each of the first image and the second image when the magnification $\alpha 1$ and the magnification $\alpha 2$ are larger than 1.

8. The image quality adjustment device according to claim 6, wherein the first electric filter removes at least the spatial frequency component greater than or equal to fd/2 from a synthesis image in which the first image from which the first moire component is removed and the second image from which the second moire component is removed are synthesized when the magnification $\alpha 1$ and the magnification $\alpha 2$ are larger than 1.

9. The image quality adjustment device according to claim 1, wherein the executable instructions, when executed by said processor, cause said image quality adjustment device to further function as a correction table generator that generates a correction table for correcting luminance of the display panel using the first image from which at least the spatial frequency component greater than or equal to fd/2 is removed.

10. An image quality adjustment system comprising:
    the image quality adjustment device according to claim 1; and
    a camera that outputs to the image quality adjustment device an image obtained by capturing an image of the display panel,
    wherein the camera includes an optical filter that removes a spatial frequency component greater than or equal to a half of a sampling frequency of the camera.

11. An image quality adjustment device comprising:
    a processor; and
    a non-transitory computer-readable medium having stored thereon executable instructions that, when executed by said processor, cause said image quality adjustment device to function as:
    a lighting controller that controls a display panel including a plurality of pixels, each of the plurality of pixels including a plurality of subpixels such that the display panel displays a measurement image in which a part of the plurality of subpixels is lit;

a first electric filter that removes at least a spatial frequency component greater than or equal to fd/2 from a first image obtained by capturing the measurement image displayed on the display panel using a capture device when a panel spatial frequency determined by a pixel pitch of the pixel in a direction in which the plurality of subpixels are arrayed is set to fd; and a capture controller that controls a spatial sampling frequency of the capture device to a first spatial sampling frequency determined by a pixel pitch of the capture device, wherein assuming that $\alpha 1$ is magnification of the first spatial sampling frequency with respect to the panel spatial frequency fd, the capture controller controls the first spatial sampling frequency such that the magnification $\alpha 1$ is smaller than 1, and assuming that fs1 is the first spatial sampling frequency, the first electric filter removes a spatial frequency component greater than or equal to a maximum value in $ABS(fs1/\alpha 1 - n1 \times fs1)$, $ABS(2fs1/\alpha 1 - n2 \times fs1)$, and $ABS(3fs1/\alpha 1 - n3 \times fs1)$ from the first image, a coefficient n1 is an integer satisfying $ABS(fs1/\alpha 1 - n1 \times fs1) < fs1/2$, a coefficient n2 is an integer satisfying $ABS(2fs1/\alpha 1 - n2 \times fs1) < fs1/2$, and a coefficient n3 is an integer satisfying $ABS(3fs1/\alpha 1 - n3 \times fs1) < fs1/2$, and wherein ABS indicates a function obtaining an absolute value.

12. The image quality adjustment device according to claim 11, wherein the first electric filter removes the spatial frequency components greater than or equal to $ABS(fs1/\alpha 1 - n1 \times fs1)$ when the coefficient n1 is set to a value at which $ABS(fs1/\alpha 1 - n1 \times fs1)$ becomes a minimum value.

* * * * *